(12) United States Patent
Urase et al.

(10) Patent No.: US 7,338,081 B2
(45) Date of Patent: Mar. 4, 2008

(54) TRUCK FRAME FOR A CONSTRUCTION MACHINE

(75) Inventors: Kouhei Urase, Shiga (JP); Hironao Ishikawa, Shiga (JP); Saori Sawai, Kosai (JP)

(73) Assignee: Hitachi, Construction Machinery Co., Ltd., Tokyo (JP)

( * ) Notice: Subject to any disclaimer, the term of this patent is extended or adjusted under 35 U.S.C. 154(b) by 333 days.

(21) Appl. No.: 10/514,937

(22) PCT Filed: Nov. 21, 2003

(86) PCT No.: PCT/JP03/14934

§ 371 (c)(1),
(2), (4) Date: Nov. 18, 2004

(87) PCT Pub. No.: WO2004/048182

PCT Pub. Date: Jun. 10, 2004

(65) Prior Publication Data

US 2005/0225069 A1    Oct. 13, 2005

(30) Foreign Application Priority Data

Nov. 28, 2002 (JP) .............................. 2002-345933

(51) Int. Cl.
*B62D 24/00* (2006.01)
(52) U.S. Cl. ..................................................... 280/781
(58) Field of Classification Search ................ 280/781, 280/793, 794
See application file for complete search history.

(56) References Cited

U.S. PATENT DOCUMENTS 2,144,760 A * 1/1939 Harnischfeger ............. 212/253
2,991,132 A * 7/1961 Schwartz et al. ............. 305/60
4,231,699 A * 11/1980 Thompson ................... 414/687
4,266,679 A * 5/1981 Juergens ....................... 212/181
6,330,778 B1 * 12/2001 Jakobsson ................. 52/729.1
7,204,518 B2 * 4/2007 Kubo et al. ................. 280/781
7,204,519 B2 * 4/2007 Kubo et al. ................. 280/781

FOREIGN PATENT DOCUMENTS

| JP | 55-134091 | 3/1954 |
|----|-----------|--------|
| JP | 54-30417  | 8/1962 |
| JP | 48-35138  | 10/1973 |

(Continued)

*Primary Examiner*—Christopher P. Ellis
*Assistant Examiner*—Joseph Rocca
(74) *Attorney, Agent, or Firm*—Mattingly, Stanger, Malur & Brundidge, P.C.

(57) ABSTRACT

A left fore leg (31) is formed to shape by a casting means, integrating an inner joint portion (31A), an outer joint portion (31B) and an intermediate tubular portion (31C) into an unitary tubular structure. In this case, a joining end (31A1) of the inner joint portion (31A) as well as an outer joining end (31B1) of the outer joint portion (31B) is in the form of an open end of a rectangular shape. Accordingly, it becomes possible to cut the production cost of truck frame (11) and to form a longer welding bead around the outer periphery of the respective inner and outer joining ends (31A1) and (31B1) to enhance the joint strength between the inner joint portion (31A) and a center frame (12) as well as the joint strength between the outer joint portion (31B) and a side frame (22).

5 Claims, 20 Drawing Sheets

FOREIGN PATENT DOCUMENTS

| | | | |
|---|---|---|---|
| JP | 62-59577 | | 4/1987 |
| JP | 1-181972 | | 7/1989 |
| JP | 06001260 A | * | 1/1994 |
| JP | 9-142337 | | 6/1997 |
| JP | 11-278300 | * | 10/1999 |
| JP | 2001-260958 | | 9/2001 |
| JP | 2002/146831 | | 5/2002 |
| JP | 2002-146831 | | 5/2002 |

* cited by examiner

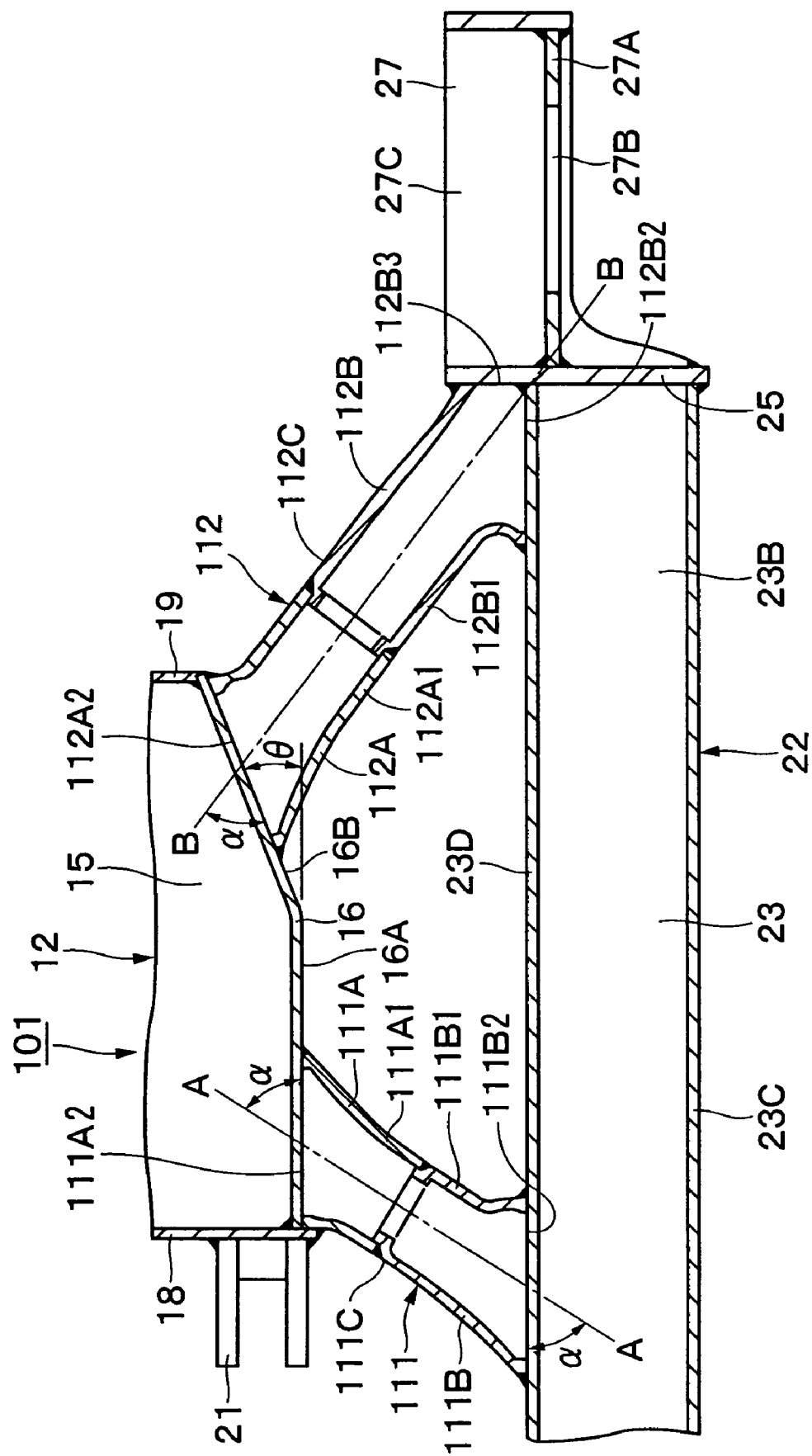

TRUCK FRAME FOR A CONSTRUCTION MACHINE

TECHNICAL FIELD

This invention relates to a truck frame particularly suitable for use on a lower structures of a construction machines such as a hydraulic excavator, a hydraulic crane or the like.

BACKGROUND ART

Generally, construction machines like hydraulic excavator are mounted on a crawler type lower structure with right and left crawler belts to drive the machine in a stable state even on rough terrains such as mountainous and muddy terrains.

The conventional crawler type lower structures of this sort are provided with a truck frame including a center frame for supporting an upper structure, right and left side frames which are located on the right and left sides of the center frame to extend toward and between front and rear ends, and front and hind legs which are bridged between the center frame and the right and left side frames (e.g., as disclosed in Japanese Laid-Open Patent Application H9-142337).

A center frame is providing on the round girth member, and four legs, i.e., a left fore leg, a right fore leg, a left hind leg and a right hind leg, are extended radially outward in the shape of letter "X" from the center frame to connect the center frame with the right and left side frames. In this instance, for example, a left fore leg is formed in a box-like structure enclosed by upper and lower leg-forming plates which are extended in face to face relation from the center frame toward the left side frame, and by front and rear leg-forming plates which are welded to the front and rear edges of the upper and lower plates. Similarly to the left fore leg, the other legs, namely, a right fore leg, a left hind leg and a right hind leg, are also formed in a box-like structure enclosed by upper and lower plates and front and rear plates on four sides.

In the case of the truck frame of the prior art mentioned above, each one of the four legs of a truck frame is fabricated from four separate leg-forming plate members, that is to say, from upper, lower, front and rear plates. Therefore, at the time of forming and assembling each leg, it has been required to cut the upper, lower, front and rear plates according to the shape of the leg to be formed, and to weld the front and rear plates to the front and rear sides of the upper and lower plates on an assembling site. These cutting and welding operations are required for each one of the four legs, and of course reflected by a high truck frame production cost.

Further, at the time of welding to the side frames the four legs which are provided integrally with the center frame as mentioned above, it is also required to cut out a precision joint portion at the outer end of each leg, which will butt against a joint surface on the side of a side frame in a gapless state.

A great problem in this regard has been that it is very likely for machining errors to occur to a joint portion which is formed at the outer end of each leg by an on-site cutting operation, and the joint strength of the respective legs with a corresponding side frame is often impaired by existence of gap spaces or interstices in the butt-joined portions between the legs and the side frames.

DISCLOSURE OF THE INVENTION

In view of the above-discussed problems with the prior art, it is an object of the present invention to provide a truck frame for a construction machine, which is enhanced in joint strength of respective legs with a center frame and a side frame, and also becomes possible to cut the production cost.

In accordance with the present invention, in order to solve the problems mentioned above, there is provided a truck frame for a construction machine, including a center frame for mounting an upper structure, right and left side frames located on the right and left sides of the center frame and extended toward front and rear ends, fore and hind legs provided on each side of the center frame to connect the right and left side frames.

The truck frame according to the invention is characterized in that: each one of the legs is composed of an inner joint portion to be joined with the center frame by welding, an outer joint portion to be joined with one of the side frames by welding, and an intermediate tubular portion provided between the inner joint portion on the side of the center frame and the outer joint portion on the side of the side frame; at least one of the inner and outer joint portions being formed in the shape of a flare tube being spread gradually from the intermediate tubular portion toward a joining end; and the joining end of the joint portion being an open end of a substantially rectangular shape.

With the arrangements just described, at least one of the inner and outer joint portions of each leg is formed in the shape of a flare tube being spread gradually and the joining end of the joint portion is formed in a substantially rectangular shape. As a result, it becomes possible to form a long welding bead around the outer periphery of the joining end to enhance the joint strength of legs with the center frame or side frame.

In a preferred form of the present invention, the inner joint portion on the side of the center frame is formed in the shape of a flare tube and the joining end of the inner joint portion is formed in an open end of substantially rectangular shape. In this case, a longer welding bead can be formed around the outer periphery of the joining end of the inner joint portion on the side of the center frame to ensure enhanced joint strength of legs with the center frame.

In another preferred form of the present invention, the outer joint portion on the side of a side frame is formed in the shape of a flare tube and the joining end of the outer joint portion is formed in an open end of a substantially rectangular shape. In this case, a longer welding bead can be formed around the outer periphery of the joining end of the outer joint portion on the side of the side frame to ensure enhanced joint strength of legs with the side frame.

In still another preferred form of the present invention, both of the inner joint portion on the side of the center frame and the outer joint portion on the side of a side frame are formed in the shape of a flare tube and joining ends of the each joint portions are formed in an open end of a substantially rectangular shape.

In this case, a longer welding bead can be formed not only around the joining end of the inner joint portion on the side of the center frame but also around the joining end of the outer joint portion on the side of a side frame to ensure enhanced joint strength of legs with the center and side frames.

According to the present invention, the legs are each constituted by an unitary tubular structure formed by a casting means, containing the inner and outer joint portions and the intermediate tubular portion as integral parts.

With the arrangements just described, the joining end of at least the inner joint portion on the side of the center frame or the outer joint portion on the side of a side frame can be formed in a substantially rectangular shape even in a case where the inner and outer joint portions and the intermediate tubular portion are integrally cast into an unitary tubular structure. Therefore, a longer welding bead can be formed around the outer periphery of the joining end to enhance the joint strength. In addition, it becomes possible to cut the production cost of the truck frame because the respective parts of a leg can be integrally formed into an unitary tubular structure by a casting means.

According to another preferred form of the present invention, the legs are each constituted by an unitary tubular structure formed by joining together three members including an inner joint member for said inner joint portion on the side of the center frame, an outer joint member for said outer joint portion on the side of a side frame and an intermediate tubular member for said intermediate tubular portion.

With the arrangements just described, even in a case where a leg is formed by together three members including joining inner and outer joint members with an intermediate tubular member, at least one of the joining end of the inner joint member on the side of the center frame or of the outer joint member on the side of a side frame can be formed in a rectangular shape. This means that a longer welding bead can be formed around the outer periphery of the joining end to enhance the joint strength.

According to a further preferred form of the present invention, the legs are each constituted by an unitary tubular structure formed by joining together two members including inner joint member for an inner joint portion on the side of said center and outer joint member for an outer joint portion on the side of either one of said side frames in such a way as to provide an intermediate tubular portion in a longitudinally intermediate portion between inner and outer joint portions.

With the arrangements, even in a case where a leg is formed by joining together two members including inner and outer joint members, at least one of the inner joint member on the side of the center frame or the outer joint member on the side of a side frame can be formed in a rectangular shape. It follows that a longer welding bead can be formed around the outer periphery of the joining end.

In a still another preferred form of the present invention, the center frame includes: a top plate, including a round girth member having to support thereon the upper structure rotatably through a swing ring, a bottom plate located under the top plate in face to face relation, and right and left side plates attached to right and left sides of the top and bottom plates across said round girth member; each one of the right and left side plates being provided with a fore leg joint surface and a hind leg joint surface in front and rear portions thereof for joining thereto inner joint portions of said fore and hind legs, respectively, the fore leg joint surface being extended in a longitudinal direction and in parallel relation with a side frame, and the hind leg joint surface being disposed angularly relative to the fore leg joint surface and extended in an oblique direction to turn away from the side frame in a rearward direction.

With the arrangements just described, the hind leg joint surface on each one of the right and left side plates of the center frame is bent to turn away from a side frame in a rearward direction from the fore leg joint surface. Therefore, the hind leg joint surface can be joined with the upper and bottom plates of the center frame at positions in the vicinity of the round girth member to enhance the joint strength with the center frame.

In a further preferred form of the present invention, the fore legs are each extended in an obliquely forward direction toward a side frame from the fore leg joint surface on a side plate of the center frame, and the hind legs are each extended in an obliquely rearward direction toward a side frame from the hind leg joint surface on a side plate of the center frame, in such a way that axial center lines of the fore and hind legs intersect said fore leg joint surface and said hind leg joint surface with the same angle of intersection, respectively.

With the arrangements just described, outer joint portions of the fore and hind legs, on the side of a side frame, are spread apart and can be joined with fore and rear end portions of the side frame to enhance the fastness of attachment of the side frame relative to the center frame.

BRIEF DESCRIPTION OF THE DRAWINGS

In the accompanying drawings:

FIG. 24 is an enlarged horizontal sectional view of center frame, left side frame, left fore leg, left hind leg adopted in a fifth embodiment of the present invention.

BEST MODE FOR CARRYING OUT THE INVENTION

Figure 1:
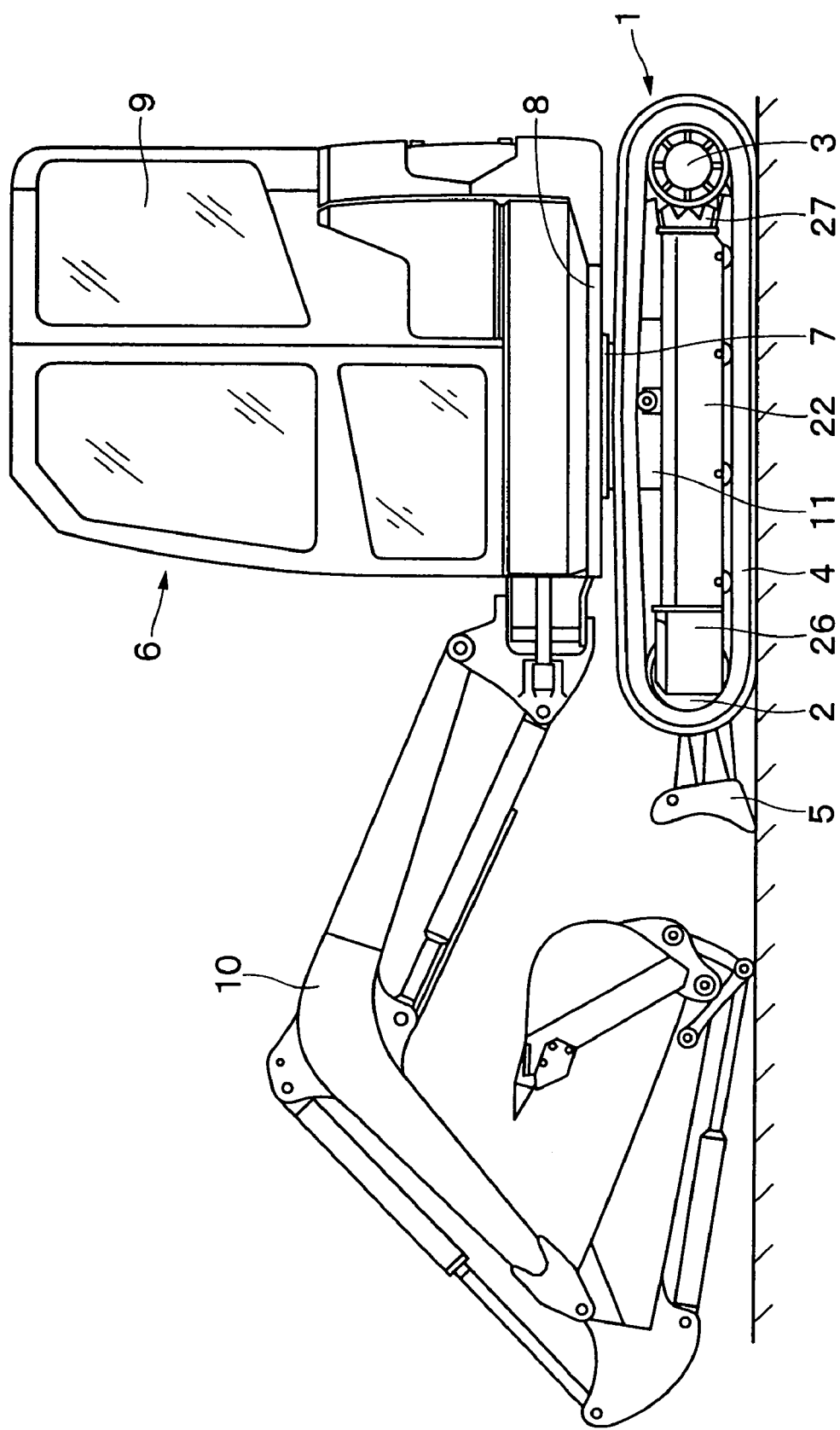
FIG. 1 is a front view of a hydraulic excavator adopting a truck frame according to a first embodiment of the present invention.

Hereafter, with reference to FIGS. 1 through 25 of the accompanying drawings the truck frame of the present invention is described more particularly by way of its preferred embodiments which are applied by way of example to a lower structure of a hydraulic excavator type excavator.

Firstly, referring to FIGS. 1 to 10, there is shown a truck frame of a hydraulic excavator according to a first embodiment of the present invention.

In those figures, indicated at 1 is a lower structure of a hydraulic excavator, which is largely constituted by a truck frame 11, which will be described in greater detail hereinafter, an idle wheel 2 and a drive wheel 3 provided at longitudinal ends of each one of side frames 22 and 28 of the truck frame 11, and a crawler belt 4 passed around the idle and drive wheels 2 and 3.

By driving the crawler belts 4 to turn around the drive wheels 3, the lower structure 1 can travel on rough terrains like muddy grounds in a stable state. A sweeper blade 5 is vertically pivotally supported on the front side of the lower structure 1 for use in soil or dirt discharging or ground leveling operations.

Indicated at 6 is an upper structure which is swingably mounted on the lower structure 1. The upper structure 6 includes a revolving frame 8 which is provided on the truck frame 11 through a swing ring 7, and a cab 9 which is provided on the revolving frame 8 to define an operator's room. A working mechanism, for example, a swing post type working mechanism 10 is provided in a front side portion of the upper structure 6 to carry out ground digging operations.

Figure 2:
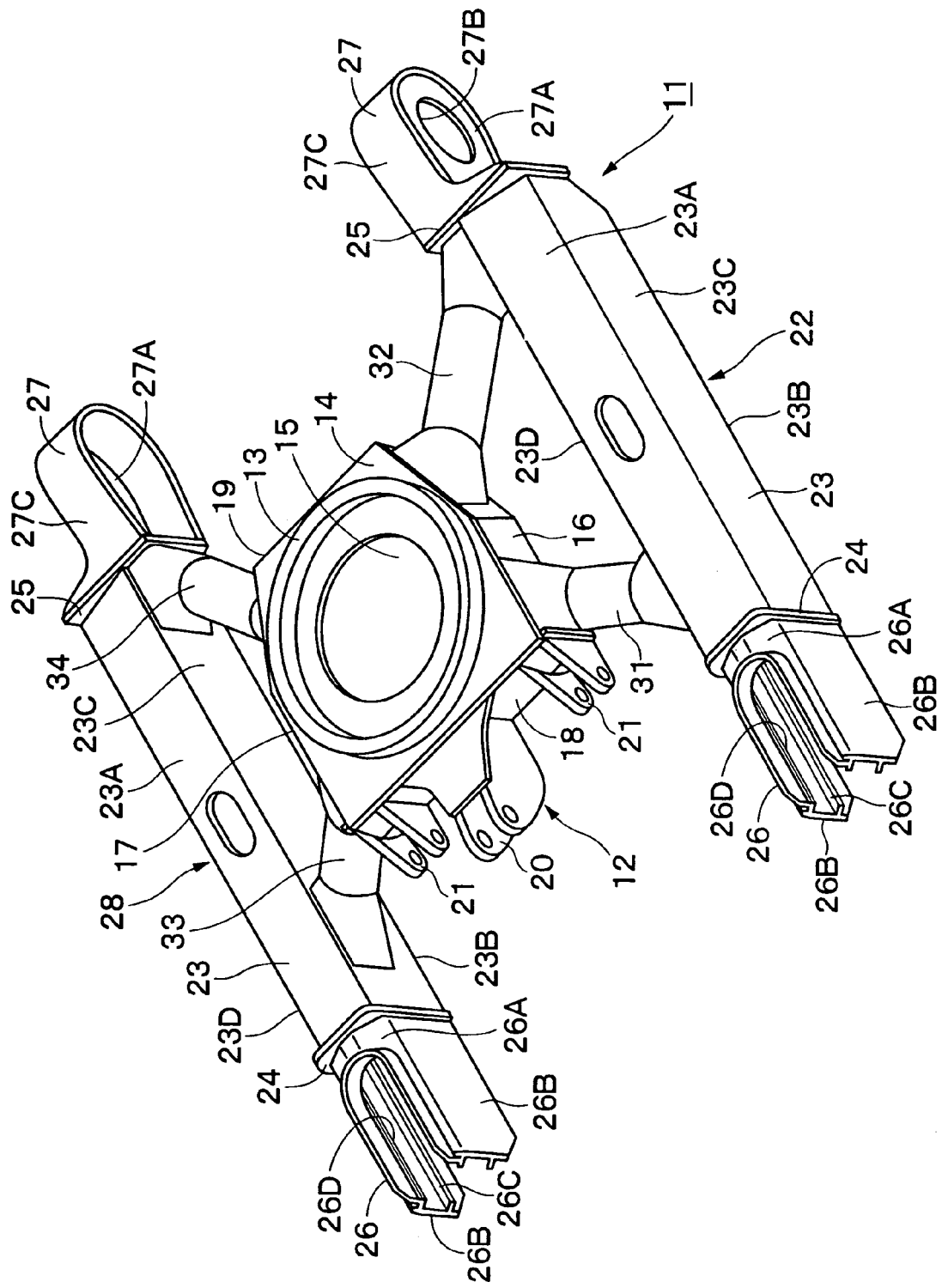
FIG. 2 is an enlarged perspective view of the truck frame.
Figure 3:
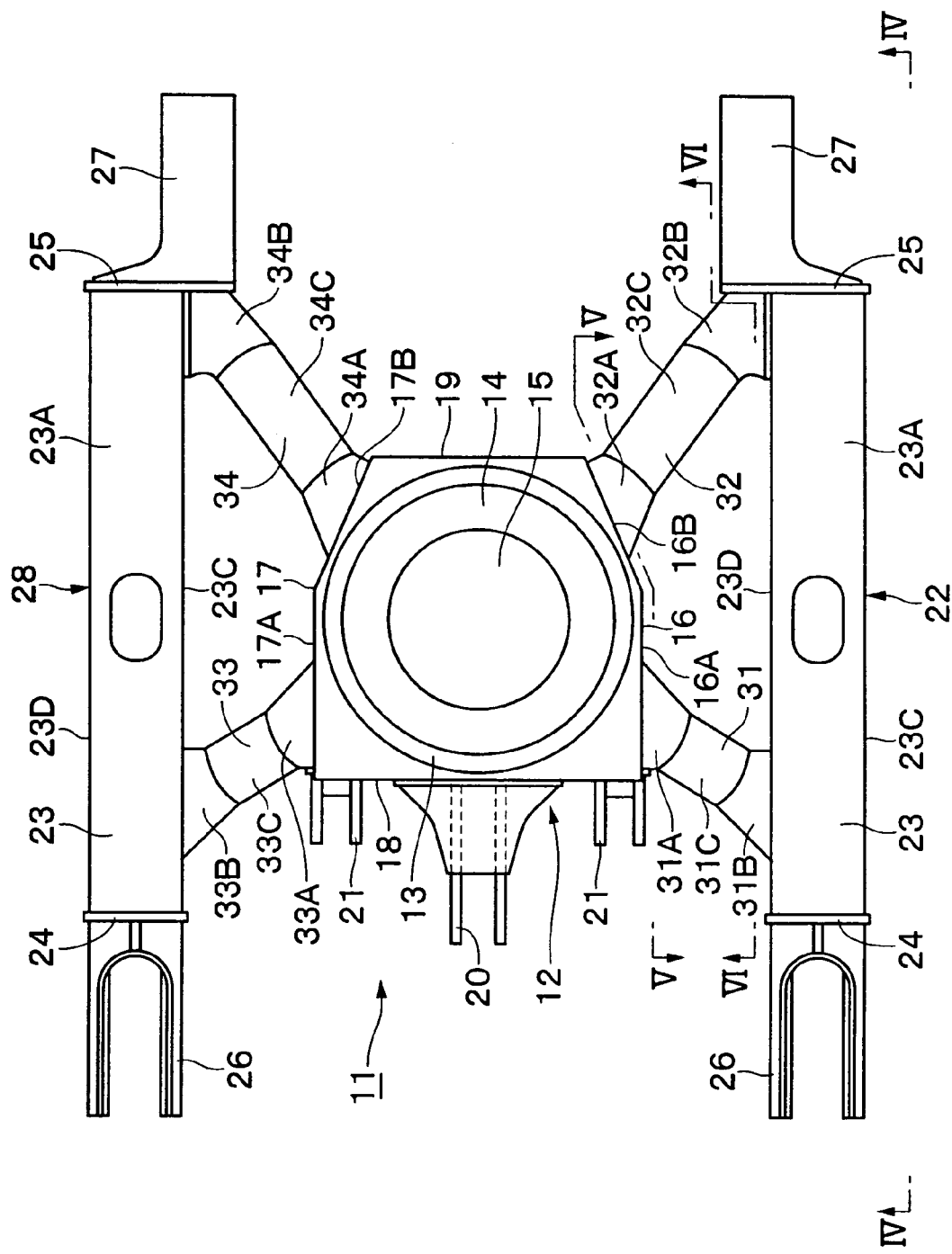
FIG. 3 is a plan view of the truck frame taken from above.
Figure 4:
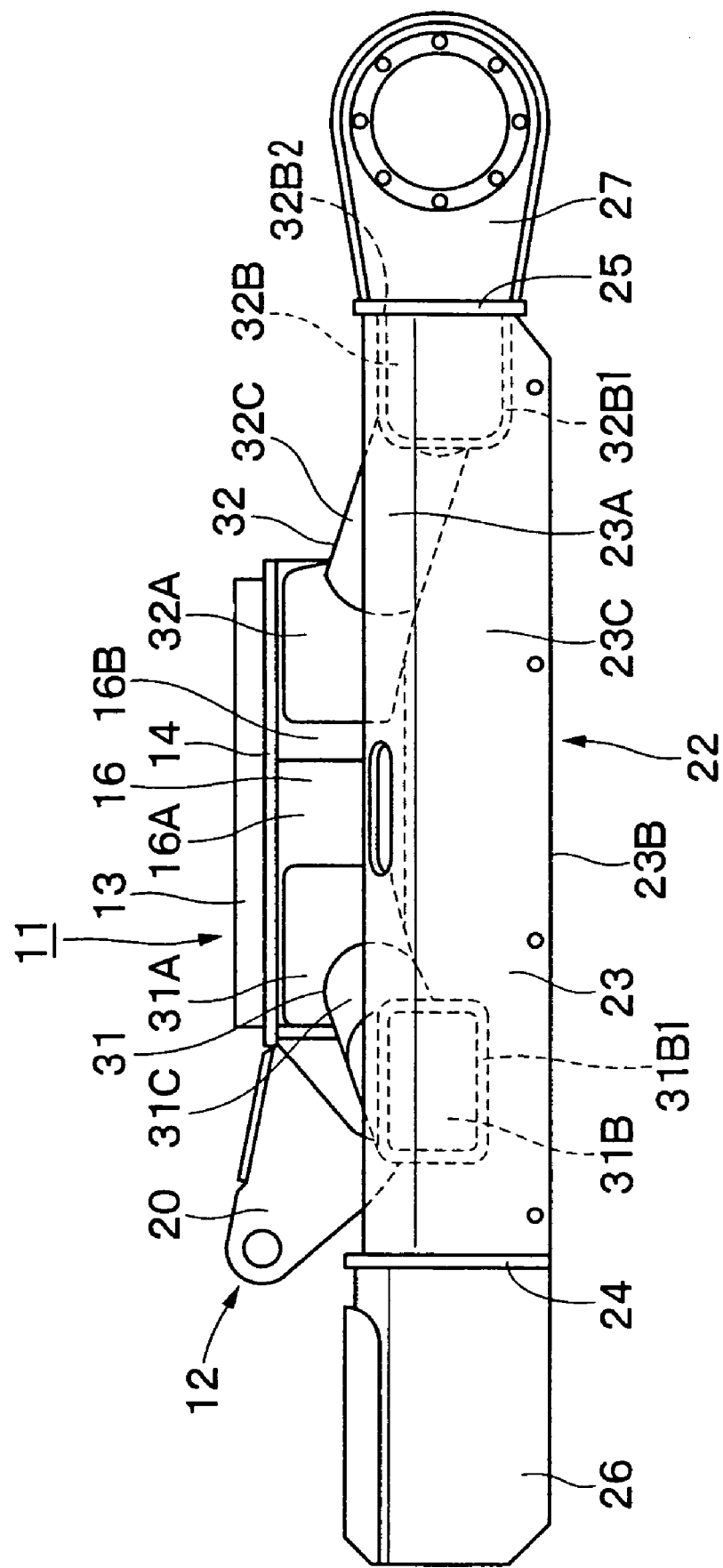
FIG. 4 is a front view of the truck frame taken in the direction of arrows IV-IV in FIG. 3.

Denoted at 11 is the truck frame of the lower structure 1, which is composed of, as shown in FIGS. 2 to 4, a center frame 12, a left side frame 22, a right side frame 28, a left fore leg 31, a left hind leg 32, a right fore leg 33 and a right hind leg 34 which are described hereinafter.

Designated at 12 is the center frame which constitutes a center portion of the truck frame 11. In this instance, the center frame 12 is constituted by a top plate 14 of a hexagonal shape having a round girth member 13 securely fixed centrally on the top side thereof for mounting the swing ring 7, a bottom plate 15 formed in a hexagonal shape similarly to the top plate 14 and located vertically in face to face relation with the top plate 14, left and right side plates 16 and 17 which are located on the left and right sides of the top and bottom plates 14 and 15 across the round girth member 13, a front plate 18 located transversely on the front side of the left and right side plates 16 and 17, and a rear plate 19 located transversely on the rear side of the left and right side plates 16 and 17. The rear plate 19 is smaller in width than the front plate 18.

Figure 7:
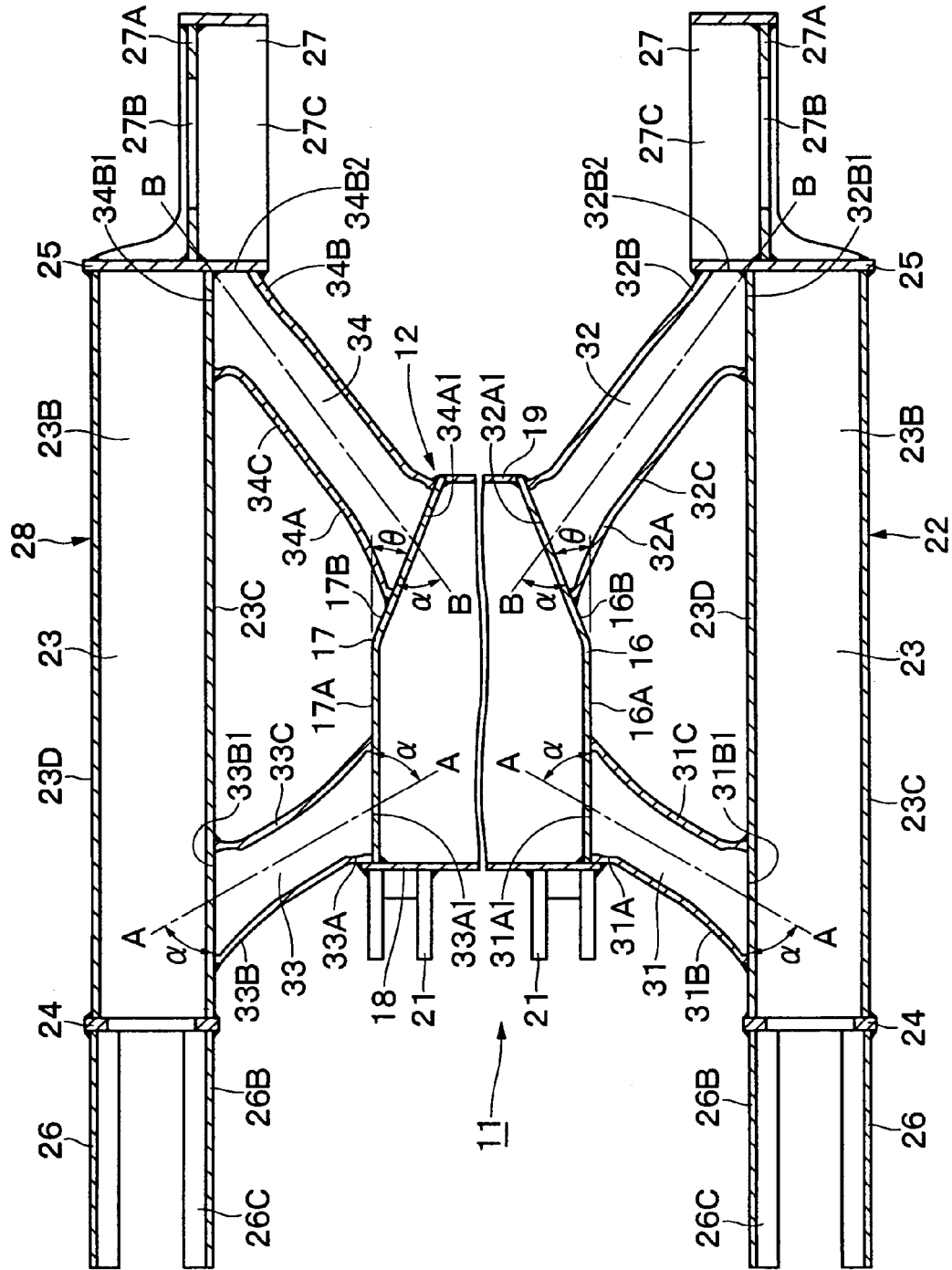
FIG. 7 is a partly cutaway horizontal sectional view of the center frame, left and right side frames, left fore leg, left hind leg, right fore leg and right hind leg shown in FIG. 3.
Figure 8:
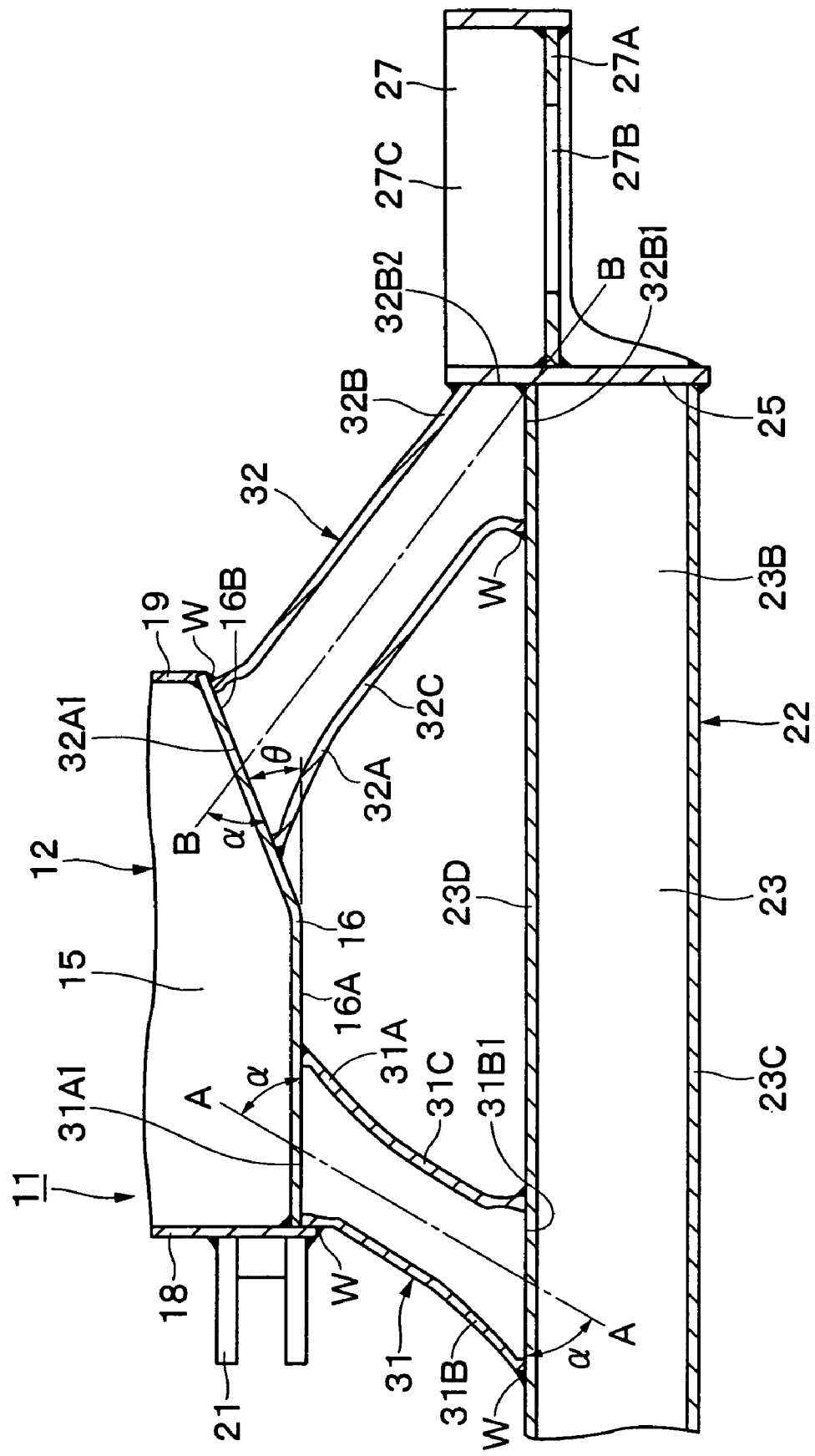
FIG. 8 is a horizontal sectional view on an enlarged of the center frame, left side frame, left fore leg and left hind leg shown in FIG. 7.

In this instance, as shown in FIGS. 7 and 8, the left side plate 16 is composed of a fore leg joint surface 16A which is extended from its fore end (which is joined with the front plate 18) to its longitudinally intermediate portion substantially in parallel relation with the side frame 22 described hereinafter, and a hind leg joint surface 16B which is provided on the rear side of the fore leg joint surface 16A and bent away from the side frame 22 in the rearward direction (which is joined with the rear plate 19) at a predetermined angle θ. The fore leg joint surface 16A is a surface for joining an inner joint portion 31A of a left fore leg 31 which will be described hereinafter, while the hind leg joint surface 16B is a surface for joining an inner joint portion 32A of a left hind leg 32 which will also be described hereinafter.

On the other hand, similarly to the left side plate 16, the right side plate 17 is composed of a fore leg joint surface 17A which is extended from its fore end to its longitudinally intermediate portion substantially in parallel relation with the side frame 28 described hereinafter, and a hind leg joint surface 17B which is provided on the rear side of the fore leg joint surface 17A and bent away from the side frame 28 in the rearward direction by a predetermined angle θ. The fore leg joint surface 17A is a surface for joining an inner joint portion 33A of a right fore leg 33 which will be described hereinafter, while the hind leg joint surface 17B is a surface for joining an inner joint portion 34A of a right hind leg 34 which will also be described hereinafter.

The left side plate 16 is welded between left side portions of the top and bottom plates 14 and 15 in such a way as to close an opening between the top and bottom plates 14 and 15 from left side. Similarly, the right side plate 17 is welded between right side portions of the top and bottom plates 14 and 15 in such a way as to close an opening between the top and bottom plates 14 and 15 from right side. Further, the front plate 18 is welded between front end portions of the top and bottom plates 14 and 15 and at the same time between front end portions of the left and right side plates 16 and 17 in such a way as to close an opening between the top and bottom plates 14 and 15 from front side. Further, the rear plate 19 is welded between rear end portions of the top and bottom plates 14 and 15 and at the same time between rear end portions of the left and right side plates 16 and 17 to close an opening between the top and bottom plates 14 and 15 from rear side. As a consequence, the center frame 12 is formed in a box-like structure which is enclosed by the top plate 14, bottom plate 15, left side plate 16, right side plate 17, front plate 18 and rear plate 19.

In this manner, on the center frame 12, the hind leg joint surface 16B of the left side plate 16 is angularly bent away from the side frame 22 in the rearward direction of the fore leg joint surface 16A, while the hind leg joint surface 17B of the right side plate 17 is angularly bent away from the side frame 28 in the rearward direction of the fore leg joint surface 17A. Therefore, the hind leg joint surface 16B of the left side plate 16 as well as the hind leg joint surface 17B of the right side plate 17 is extended obliquely rearward along outer periphery of the round girth member 13. This contributes to enhance the strength of the center frame 12 because both of the hind leg joint surface 16B of the left side plate 16 and the hind leg joint surface 17B of the right side plate 17 can be joined with the top and bottom plates 14 and 15 in the vicinity of a position where loads of the upper structure 6 are exerted on the round girth member 13.

Indicated at 20 is a mounting bracket which is securely welded to a center portion of the front plate 18 of the center frame 12. This mounting bracket is projected forward of the front plate 18. A hydraulic cylinder (not shown) is pivotally connected to the mounting bracket 20 to lift up and down the sweeper blade 5 which is shown in FIG. 1.

Denoted at 21 are a pair of supporting brackets which are welded on the front plate 18 of the center frame 12 on the right and left sides of the mounting bracket 20. These supporting brackets 21 are each projected forward of the center frame 21 in an obliquely downward direction. These supporting brackets 21 are pivotally connected to the right and left arms (not shown) of the sweeper blade 5 which is shown in FIG. 1.

Indicated at 22 is a left side frame which is located on the left side of the center frame 12 and extended in the forward and rearward directions. This side frame 22 is composed of an intermediate frame portion 23, a front connecting flange 24, a rear connecting flange 25, an idle wheel bracket 26, a motor bracket 27 which will be described hereinafter.

The intermediate frame portion 23 constitutes a main body portion of the side frame 22, and is in the form of a square tube which is fabricated by bending and welding a steel plate or plates. More specifically, the intermediate frame portion 23 which extends in the forward and rearward directions is square in sectional shape and enclosed by a top plate 23A, a bottom plate 23B, a left side plate 23C and a right side plate 23D.

Indicated at 24 is the front connecting flange which closes the front end of the intermediate frame portion 23. This front connecting flange 24 is in the form of a flat steel plate and securely affixed to the fore end of the intermediate frame portion 23 by welding.

Designated at 25 is a rear connecting flange which closes the rear end of the intermediate frame portion 23. Likewise, the rear flange is in the form of a flat steel plate and securely affixed to the rear end of the intermediate frame portion 23 by welding. In this instance, for joining motor bracket 27 and left hind leg 32 which will be described hereinafter, the rear connecting flange 25 is arranged to have a greater breadth in the transverse direction as compared with the front connecting flange 24, and is extended in an inward direction (toward the center frame 12) from the intermediate frame portion 23.

Indicated at 26 is the idle wheel bracket for mounting the idle wheel 2. This idle wheel bracket 26 is securely attached to the front end of the intermediate frame portion 23 through the front connecting flange 24. In this instance, the idle wheel bracket 26 is in the form of a frame structure having a top plate 26A and right and left side plates 26B, which is fabricated, for example, by bending steel plates, and internally provided with idle wheel guides 26C as shown in FIG. 1 to support the idle wheel 2 movably in back and forth directions. Further, a notch 26D substantially of U-shape is formed in the top plate 26A of the idle wheel bracket 26 to permit back and forth movements of the idle wheel 2 along the idle wheel guides 26C.

Indicated at 27 is the motor bracket for mounting a vehicle drive motor (not shown) which drives the drive wheel 3. This motor bracket 27 is securely attached to the rear end of the intermediate frame portion 23 through the rear connecting flange 25. In this instance, the motor bracket 27 includes a mounting plate 27A which is securely fixed to the rear surface of the rear connecting flange 25 and arcuately projected in the rearward direction, a motor mount hole 27B which is formed of the mounting plate 27A, and a flange plate 27C substantially of U-shape which is securely fixed to peripheral edge portions of the mounting plate 27A. A vehicle drive motor (not shown) which is mounted on the mounting plate 27A of the motor bracket 27 is coupled with a drive wheel 3 through a reduction mechanism or the like.

Denoted at 28 is the right side frame which is located on the right side of the center frame 12 and extended in the forward and rearward directions. Similarly to the left side frame 22, this side frame 28 on the right side is composed of an intermediate frame portion 23, a front connecting flange 24, a rear connecting flange 25, an idle wheel bracket 26 and a motor bracket 27.

Indicated at 31 is a left fore leg which is bridged between the center frame 12 and the left side frame 22, together with a left hind leg 32 which will be described hereinafter. This left fore leg 31 is joined with a front portion of the center frame 12 (left side plate 16) at its inner end and joined with the right side plate 23D of the intermediate frame portion 23 of the left side frame 22 at its outer end which is extended out in an obliquely forward direction.

Figure 9:
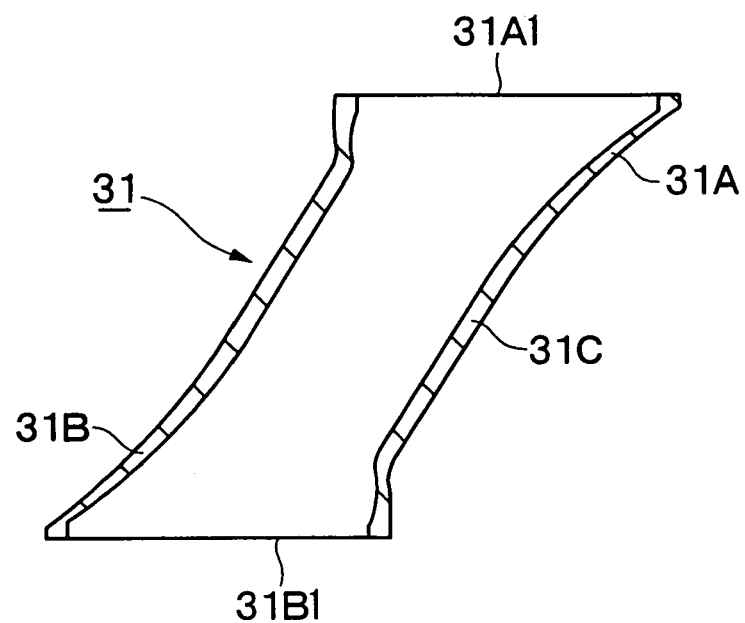
FIG. 9 is a sectional view showing the left fore leg in FIG. 8 alone.

In this instance, as shown in FIGS. 7 to 9, the left fore leg 31 is composed of an inner joint portion 31A to be joined with the fore leg joint surface 16A of the left side plate 16 of the center frame 12 by welding, an outer joint portion 31B to be joined with the right side plate 23D of the side frame 22 (the intermediate frame portion 23) by welding, and an intermediate tubular portion 31C intervening between the inner and outer joint portions 31A and 31B. These inner joint portion 31A, outer joint portion 31B and intermediate tubular portion 31C are integrally formed into one and single tubular structure by a casting means using molten iron-base metal such as, for example, casting steel material or weldable casting iron (e.g., decarburized casting iron).

In this case, as shown in FIGS. 7 and 8, the left fore leg 31 is extended out in an obliquely forward direction from the fore leg joint surface 16A of the left side plate 16 toward the side frame 22. On the other hand, the fore leg joint surface 16A of the left side plate 16 is disposed parallel with the side frame 22. Therefore, an axial center line A-A of the left fore leg 31 intersects the fore leg joint surface 16A of the left side plate 16 with an angle α on the rear side, which is equal with a front intersection angle α of the axial center line A-A relative to the right side plate 23D of the side frame 22.

Figure 5:
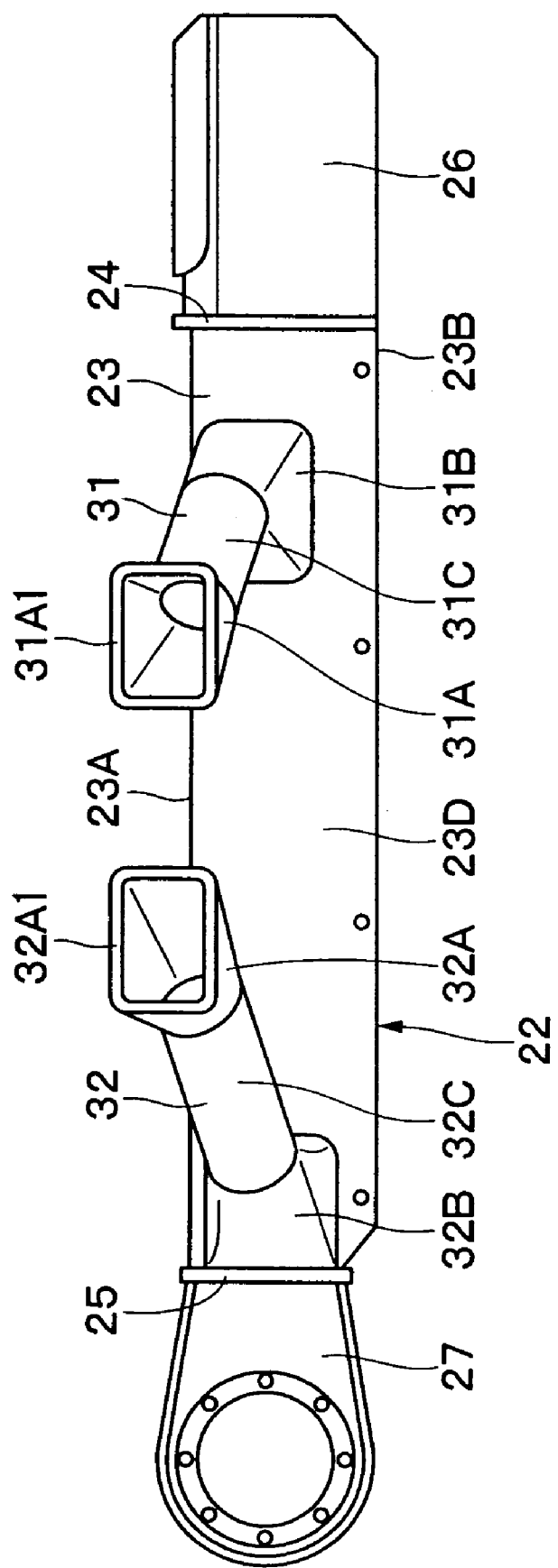
FIG. 5 is a back view of joining ends of inner joint portions of left fore and hind legs on the side of the center frame, taken in the direction of arrows V-V in FIG. 3.

Further, the inner joint portion 31A on the side of the center frame is formed in the shape of a flare tube which is gradually spread from the intermediate tubular portion 31C toward an inner joining end 31A1 (an open end on the side of the center frame 12). In this instance, as shown in FIGS. 5 and 8, the inner joining end 31A1 is an open end of a rectangular shape having longer sides extended in the longitudinal direction along the fore leg joint surface 16A, and arranged to butt on the fore leg joint surface 16A in a gapless state. Edges at an upper longer side of the inner joining end 31A1 are located in close proximity of the top plate 14 and edges at a bottom longer side are located in close proximity of the bottom plate 15, while edges at its fore shorter side are located in close proximity of the front plate 18.

Thus, at the time of joining the inner joining end 31A1 of the inner joint portion 31A on the side of the center frame with the fore leg joint surface 16A of the left side plate 16 by butt welding, it is possible to form a longer welding bead W around the outer periphery of the inner joining end 31A1 as shown in FIG. 8 to enhance the joint strength between the inner joint portion 31A and the center frame 12. Besides, the inner joint portion 31A is formed in the shape of a flare tube having a smoothly varying sectional shape from the intermediate tubular portion 31C toward the inner joining end 31A1. This sectional shape of the inner joint portion contributes to lessen stresses which would be exerted on joint portions between the center frame 12 and the left fore leg 31.

Figure 6:
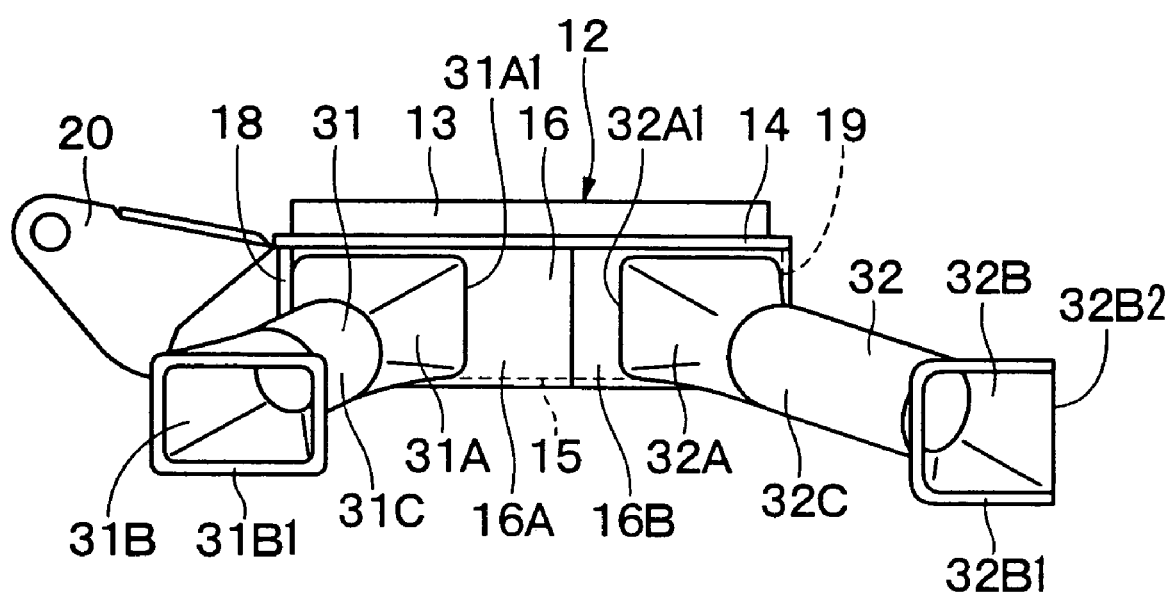
FIG. 6 is a front view of joining ends of outer joint portions of the left fore and hind legs on the side of a side frame, taken in the direction of arrows VI-VI in FIG. 3.

On the other hand, the outer joint portion 31B on the side of the side frame is also formed in the shape of a flare tube which is gradually spread from the intermediate tubular portion 31C toward an outer joining end 31B1 (an open end on the side of the side frame 22). In this instance, as shown in FIGS. 6 and 8, the outer joining end 31B1 is an open end of a rectangular shape having longer sides extended in the longitudinal direction along the right side plate 23D of the intermediate frame portion 23, and arranged to butt on the right side plate 23D in a gapless state.

Thus, at the time of joining the outer joining end 31B1 of the outer joint portion 31B with the right side plate 23D of the side frame 22, it is possible to form a longer welding bead W around the outer periphery of the outer joining end 31B1 to enhance the joint strength between the outer joint portion 31B and the side frame 22. In addition, since the outer joint portion 31B is formed in the shape of a flare tube with a sectional shape smoothly varying toward the outer joining end 31B1 from the intermediate tubular portion 31C, it can suppress stresses which will be exerted on joint portions between the side frame 22 and the left fore leg 31.

Indicated at 32 is the left hind leg which connects the left side frame 22 to the center frame 12 together with the left fore leg 31. This left hind leg 32 is joined with a rear side portion of the center frame 12 (the left side plate 16) at one end and, the other end of the left hind leg is extended obliquely rearward direction and joined with the right side plate 23D of the intermediate frame portion 23 of the side frame 22 and the rear connecting flange 25.

Figure 10:
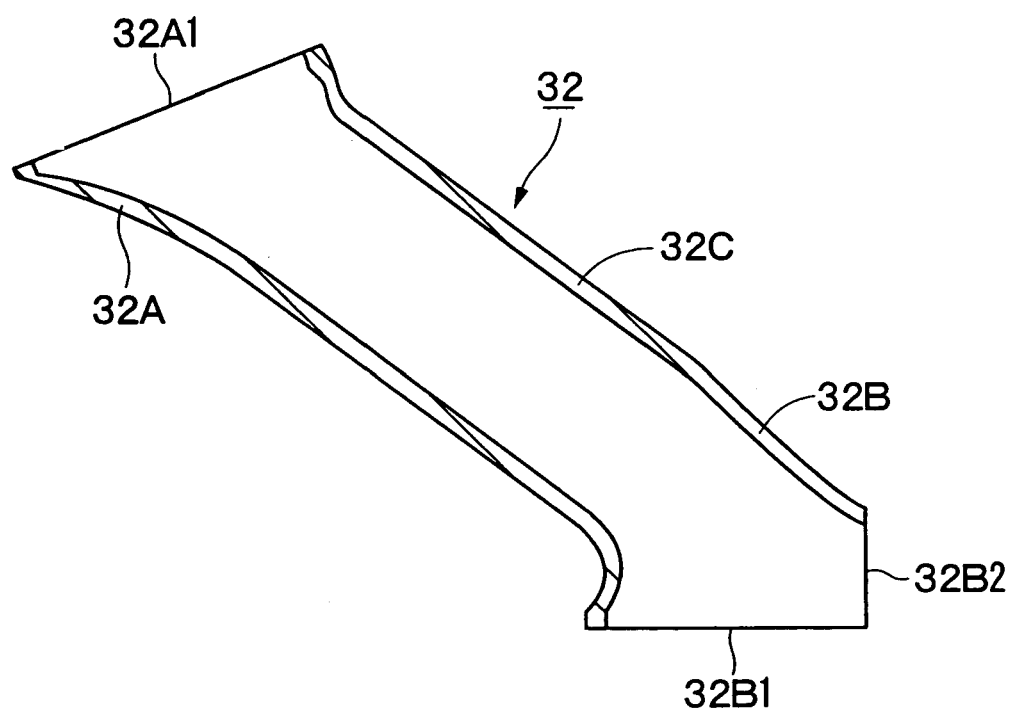
FIG. 10 is a sectional view showing the left hind leg in FIG. 8 alone.

In this instance, as shown in FIGS. 8 and 10, the left hind leg 32 is composed of an inner joint portion 32A to be joined with the hind leg joint surface 16B of the left side plate 16 of the center frame 12 by welding, an outer joint portion 32B to be joined with the right side plate 23D of the side frame 22 (the intermediate frame portion 23) and the rear connecting flange 25, and an intermediate tubular portion 32C intervening between the inner and outer joint portions 32A and 32B. These inner joint portion 32A, the outer joint portion 32B and the intermediate tubular portion 32C are integrally formed into one and single tubular structure by a casting means using molten iron-base metal such as casting steel, casting iron or the like.

In this case, as shown in FIGS. 7 and 8, the left hind leg 32 is extended in an obliquely rearward direction toward the side frame 22 from the hind leg joint surface 16B of the left side plate 16. On the other hand, the hind leg joint surface 16B of the left side plate 16 is angularly bent away from the side frame 22 by a predetermined angle θ. In this instance, an axial center line B-B of the left hind leg 32 intersects the hind leg joint surface 16B of the left side plate 16 with an angle of intersection α on the front side. This angle α is equal with a rear intersection angle α of the axial center line A-A of the left fore leg 31 relative to the fore leg joint surface 16A of the left side plate 16.

Further, the inner joint portion 32A is formed in the shape of a flare tube which is gradually spread toward an inner joining end 32A1 (an open end on the side of the center frame 12) from the intermediate tubular portion 32C of substantially normal tubular shape. In this instance, as shown in FIGS. 5 and 8, the inner joining end 32A1 is an open end of a rectangular shape having longer sides extended in the longitudinal direction along the hind leg joint surface 16B of the left side plate 16, and arranged to butt on the hind leg joint surface 16B in a gapless state. The upper and lower sides of the inner joining end 32A1 are located in close proximity of the top plate 14 and the bottom plate 15, respectively, while the rear side of the inner joining end 32A1 is located in close proximity of the rear plate 19. Further, the inner joint portion 32A on the side of the center frame is formed in the shape of a flare tube having a smoothly varying sectional shape toward the inner joining end 32A1 from the intermediate tubular portion 32C.

On the other hand, the outer joint portion 32B on the side of the side frame is also formed in the shape of a flare tube which is gradually spread from the intermediate tubular portion 32C toward a first outer joining end 32B1 (an open end on the side of the side frame 22) and another or second outer joining end 32B2 (an open end on the side of the rear connecting flange 25). In this case, as shown in FIGS. 6 and 8, the first outer joining end 32B1 is arranged to extend longitudinally along the right side plate 23D of the intermediate frame portion 23, while the second outer joining end 32B2 is arranged to extend along the surface of the rear connecting flange 25. Thus, the first outer joining end 32B1 and the second outer joining end 32B2 are located at longitudinal and transverse sides of a rectangular open end which is bent at right angles in a middle portion. The first and second outer joining ends 32B1 and 32B2 are arranged to butt on the right side plate 23D and the rear connecting flange 25 in a gapless state, respectively. Furthermore, the outer joint portion 32B on the side of the side frame is formed in the shape of a flare tube having a smoothly varying sectional shape from the intermediate tubular portion 32C toward the first and second outer joining ends 32B1 and 32B2.

Indicated at 33 is the right fore leg which connects the center frame 12 to the right side frame 28, together with the right hind leg 34 which will be described hereinafter. Similarly to the left fore leg 31, the right fore leg 33 is composed of an inner joint portion 33A to be joined with the fore leg joint surface 17A of the right side plate 17 of the center frame 12, an outer joint portion 33B to be joined with the left side plate 23C of the side frame 28 (the intermediate frame portion 23), and an intermediate tubular portion 33C intervening between the inner and outer joint portions 33A and 33B. Further, similarly to the left fore leg 31, the respective parts of the right fore leg 33 are integrally formed into one and single tubular structure by the use of a casting means.

In this instance, as shown in FIG. 7, the right fore leg 33 is extended out in an obliquely forward direction toward the side frame 28 from the fore leg joint surface 17A of the right side plate 17. Axial center line A-A of the right fore leg 33 intersects the fore leg joint surface 17A of the right side plate 17 with an angle α on the rear side, which is equal with a front intersection angle α of the axial center line A-A relative to the left side plate 23C of the side frame 28.

In this case, the inner joint portion 33A is formed in the shape of a flare tube which is gradually spread from the intermediate tubular portion 33C toward an inner joining end 33A1 (an open end on the side of the center frame 12). The inner joining end 33A1 is an open end of a rectangular shape having longer sides extended in the longitudinal direction along the fore leg joint surface 17A of the right side plate 17, and arranged to butt on the fore leg joint surface 17A in a gapless state.

On the other hand, the outer joint portion 33B is also formed in the shape of a flare tube which is gradually spread from the intermediate tubular portion 33C toward an outer joining end 33B1 (an open end on the side of the side frame 28). The outer joining end 33B1 is an open end of a rectangular shape having longer sides extended in the longitudinal direction along the left side plate 23C of the intermediate frame portion 23, and arranged to butt on the left side plate 23C in a gapless state.

Denoted at 34 is the right hind leg which connects the right side frame 28 to the center frame 12, together with the right fore leg 33. Similarly to the left hind leg 32, this right hind leg 34 is composed of an inner joint portion 34A to be joined with the hind leg joint surface 17B of the right side plate 17 of the center frame 12, an outer joint portion 34B to be joined with the left side plate 23C of the side frame 28 (the intermediate frame portion 23) and the rear connecting flange 25, and an intermediate tubular portion 34C intervening between the inner and outer joint portions 34A and 34B. Similarly to the left hind leg 32, the respective portions of this right hind leg 34 are integrally formed into one and single tubular structure by a casting means.

In this instance, as shown in FIG. 7, the right hind leg 34 is extended in an obliquely rearward direction toward the side frame 28 from the hind leg joint surface 17B of the right side plate 17. On the other hand, relative to the fore leg joint surface 17A, the hind leg joint surface 17B of the right side plate 17 is angularly bent by a predetermined inclination angle θ in a direction away of the side frame 28. In this instance, an axial center line B-B of the right hind leg 34 is arranged to intersect the hind leg joint surface 17B of the right side plate 17 with an angle of intersection α on the front side.

In the case of the particular embodiment shown, the inner joint portion 34A is formed in the shape of a flare tube which is gradually spread from the intermediate tubular portion 34C toward an inner joining end 34A1 (an open end on the side of the center frame 12). Further, the inner joining end 34A1 is an open end of a rectangular shape having longer sides extended in the longitudinal direction along the hind leg joint surface 17B of the right side plate 17, and arranged to butt on the right side plate 17 in a gapless state.

On the other hand, the outer joint portion 34B is formed in the shape of a flare tube which is gradually spread from the intermediate tubular portion 34C toward a first outer joining end 34B1 (an open end on the side of the side frame 28) and another or second outer joining end 34B2 (an open end on the side of the rear connecting flange 25). The first and second outer joining ends 34B1 and 34B2 are located at longitudinal and transverse sides of a rectangular open end which is bent at right angles in a middle portion. Further, the first and second outer joining ends 34B1 and 34B2 are arranged to butt on the left side plate 23C and the rear connecting flange 25 in a gapless state, respectively.

Being arranged in the manner as described above, the truck frame 11 according to the first embodiment, which is applied to a hydraulic excavator, has the following advantageous effects.

Firstly, with regard to the left side frame 22, each one of the left fore and hind legs 31 and 32 which are adopted to connect the left side frame 22 to the center frame 12 is formed in the shape of a single integrated tubular structure by a casting means using casting steel material, casting iron material or the like.

Therefore, it becomes possible to cut the production cost of the truck frame 11 by omission of the cutting and welding jobs which are inevitably required in the fabrication process in the case of the prior art truck frame employing legs which are fabricated by cutting and welding together top, bottom, front and rear plates.

Now, turning to the left fore leg 31, both of its inner and outer joint portions 31A and 31B of the left fore leg 31 are formed to shape by casting. It follows that the inner joint portion 31A on the side of the center frame as well as the outer joint portion 31B on the side of the side frame can be formed to shape with high precision. Therefore, the inner joint portion 31A on the side of the center frame can form a strong gapless butt joint with the left side plate 16 (the fore leg joint surface 16A), and the outer joint portion 31B on the side of the side frame also can form a strong gapless butt joint with the intermediate frame portion 23 of the side frame 22.

Further, the inner joint portion 31A as well as the outer joint portion 31B of the left fore leg 31 is formed in the shape of a flare tube which is gradually spread from the intermediate tubular portion 31C. In addition, the inner joining end 31A1 of the inner joint portion 31A on the side of the center frame and the outer joining end 31B1 of the outer joint portion 31B on the side of the side frame are formed in a rectangular shape having longer sides extended in the longitudinal direction. It follows that, in welding operations on these inner and outer joint portions, a longer welding bead W can be formed not only around the outer periphery of the inner joining end 31A1 but also around the outer periphery of the outer joining end 31B1 of the outer joint portion 31B. This means that the joint strength between the inner joint portion 31A and the center frame 12 as well as the joint strength between the outer joint portion 31B and the side frame 22 can be enhanced to a significant degree.

Furthermore, both of the inner joint portion 31A on the side of the center frame and the outer joint portion 31B on the side of the side frame of the left fore leg are formed in the shape of a flare tube having a smoothly varying sectional shape from the intermediate tubular portion 31C. These arrangements make it possible to suppress stresses which will be exerted on joint portions between the center frame 12 and the left fore leg 31 and joint portions between the side frame 22 and the left fore leg 31.

In addition, the inner joining end 31A1 of the inner joint portion 31A as well as the outer joining end 31B1 of the outer joint portion 31B is formed in a rectangular shape, so that welding rod and welding torch can be moved linearly and smoothly along the outer peripheries of the joining ends 31A1 and 31B1, permitting to carry out welding operations in an efficient manner.

Moreover, the rectangular inner joining end 31A1 of the inner joint portion 31A is welded to the left side plate 16 of the center frame 12, with upper and lower sides of the inner joining end located in close proximity of the top and bottom plates 14 and 15, respectively, and the front side in the close proximity of the front plate 18. Namely, the inner joint portion 31A is joined with the left side plate 16 of the center frame 12 in those areas where the strength of the left side plate is enhanced by joining the top, bottom and front plates 14, 15 and 18, ensuring enhanced joint strength of the inner joint portion with the left side plate.

Now, turning to the left hind leg 32, the inner joint portion 32A on the side of the center frame as well as the outer joint portion 32B on the side of the side frame of the left hind leg 32 is formed by casting. That is to say, both of the inner and outer joint portions 32A and 32B can be formed to shape with high precision. Therefore, the inner joint portion 32A can be abutted against the left side plate 16 (the hind leg joint surface 16B) of the center frame 12 in a gapless state to form a strong joint therebetween. Similarly, the outer joint portion 32B can be abutted against the intermediate frame portion 23 and the rear connecting flange 25 of the side frame 22 in a gapless state to form a strong joint therebetween.

Further, both of the inner and outer joint portions 32A and 32B of the left hind leg 32 are formed in the shape of a flare tube which is gradually spread from the intermediate tubular portion 32C. In addition, the inner joining end 32A1 of the inner joint portion 32A on the side of the center frame as well as the first outer joining end 32B1 of the outer joint portion 32B on the side of the side frame is formed in a rectangular shape having longer sides extended in the longitudinal direction. Therefore, at the time of welding, a longer welding bead W can be formed around the outer periphery of the inner joining end 32A1 of the inner joint portion 32A and around the outer periphery of the first and second outer joining ends 32B1 and 32B2 of the outer joint portion 32B. Namely, the joining this makes it possible to enhance the joint strength of the inner joint portion 32A with the center frame 12 as well as the joint strength of the outer joint portion 32B with the side frame 22 and the rear connecting flange 25.

Furthermore, both of the inner and outer joint portions 32A and 32B of the left hind leg 32 are formed in the shape of a flare tube with a sectional shape which varies smoothly from the intermediate tubular portion 32C to suppress stresses which will be exerted on joint portions between the center frame 12 and the left hind leg 32, as well as stresses which will be exerted on joint portions between the side frame 22 and the left hind leg 32.

Besides, the inner joining end 32A1 of the inner joint portion 32A and the first and second outer joining ends 32B1, 32B2 of the outer joint portion 32B are formed in a rectangular shape, so that welding rod and welding torch can be moved smoothly along the outer peripheries of the joining ends 32A1, 32B1 and 32B2 at the time of a welding operation, and welding operations can be carried out in a quite efficient manner.

Moreover, the inner joining end 32A1 of the inner joint portion 32A is welded to the left side plate 16 of the center frame 12, with upper and lower sides of the inner joining end located in close proximity of the top and bottom plates 14 and 15, respectively, and the rear side located in the close proximity of the rear plate 19. Namely, the inner joint portion 32A is joined with the left side plate 16 of the center frame 12 in those areas where the strength of the left side plate is enhanced by joining the top, bottom and rear plates 14, 15 and 19, ensuring enhanced joint strength of the inner joint portion with the left side plate.

Further, the center frame 12 according to the present embodiment of the invention has the hind leg joint surface 16B on the rear side of the fore leg joint surface 16A of the left side plate 16 angularly bent in away from the side frame 22 in the rearward direction, and the hind leg joint surface 17B on the rear side of the fore leg joint surface 17A of the right side plate 17 angularly bent away from the side frame 28 in the rearward direction. Namely, the hind leg joint surface 16B of the left side plate 16 and the hind leg joint surface 17B of the right side plate 17 are bent toward each other along the outer periphery of the round girth member 13.

This arrangement makes it possible to enhance the strength of the center frame 12 because the hind leg joint surfaces 16B and 17B of the left and right side plates 16 and 17 can be joined with the top and bottom plates 14 and 15 at positions in the vicinity of the round girth member 13 on which loads are exerted from the side of the upper structure 6.

Further, the inner joint portion 32A of the left hind leg 32 is joined with the hind leg joint surface 16B of the left side plate 16 in the vicinity of the round girth member 13, so that loads which are exerted on the center frame 12 from the side of the upper structure 6 through the round girth member 13 are allowed to escape to the side frame 22 smoothly through the left hind leg 32 to enhance the strength of the truck frame 11 as a whole against exerted loads.

Furthermore, the left fore leg 31 is extended in an obliquely forward direction from the fore leg joint surface 16A of the left side plate 16 toward the side frame 22, and the left hind leg 32 is extended in an obliquely rearward direction from the hind leg joint surface 16B of the left side plate 16 toward the side frame 22. This arrangement makes it possible to broaden the spacing between the outer joint portion 31B of the left fore leg 31 and the outer joint portion 32B of the left hind leg 32.

It follows that the outer joint portion 31B of the left fore leg 31 and the outer joint portion 32B of the left hind leg 32 can be joined with fore and rear ends of the side frame 22 (intermediate frame portion 23) respectively, to enhance fastness of the side frame 22 relative to the center frame 12.

With regard to the above-described effects of the left fore and hind leg arrangements, the same description can be applied to the right fore and hind legs 33 and 34 which connects the right side frame 28 to the center frame 12.

In the case of the above-described first embodiment, by way of example both of the inner and outer joint portions 31A and 31B of the left fore leg 31 are formed in the shape of a flare tube which is gradually spread from the intermediate tubular portion 31C (see FIG. 9).

Figure 11:
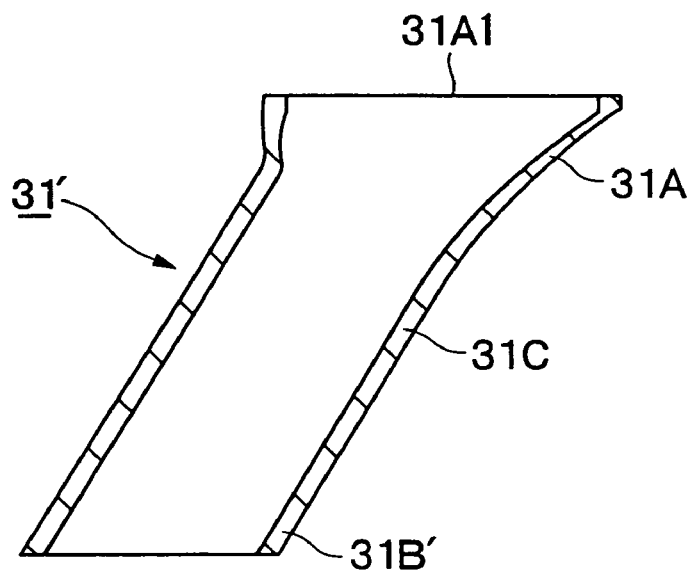
FIG. 11 is a sectional view similar to FIG. 9 but showing a left fore leg according to a first modification alone.

However, needless to say, the present invention is not limited to the particular examples shown. For instance, the legs may be arranged as in a first modification shown in FIG. 11. Namely, shown in FIG. 11 is a left fore leg 31' in which only an inner joint portion 31A is formed in the shape of a flare tube spreading toward an inner joining end 31A1 of a rectangular shape while an outer joint portion 31B' on the side of the side frame is formed as a tube of uniform diameter and of substantially the same diameter as the intermediate tubular portion 31C. The same applies to the left hind leg 32, right fore leg 33 and right hind leg 34.

Figure 12:
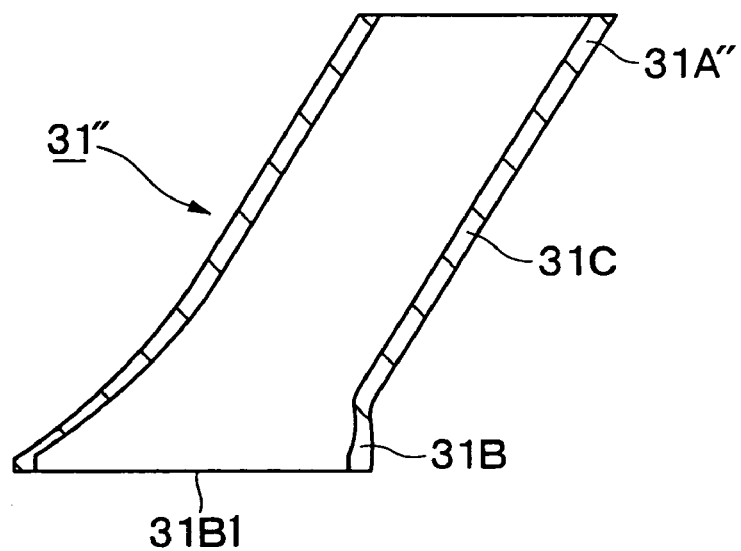
FIG. 12 is a sectional view similar to FIG. 9 but showing a left fore leg of a second modification alone.
Figure 13:
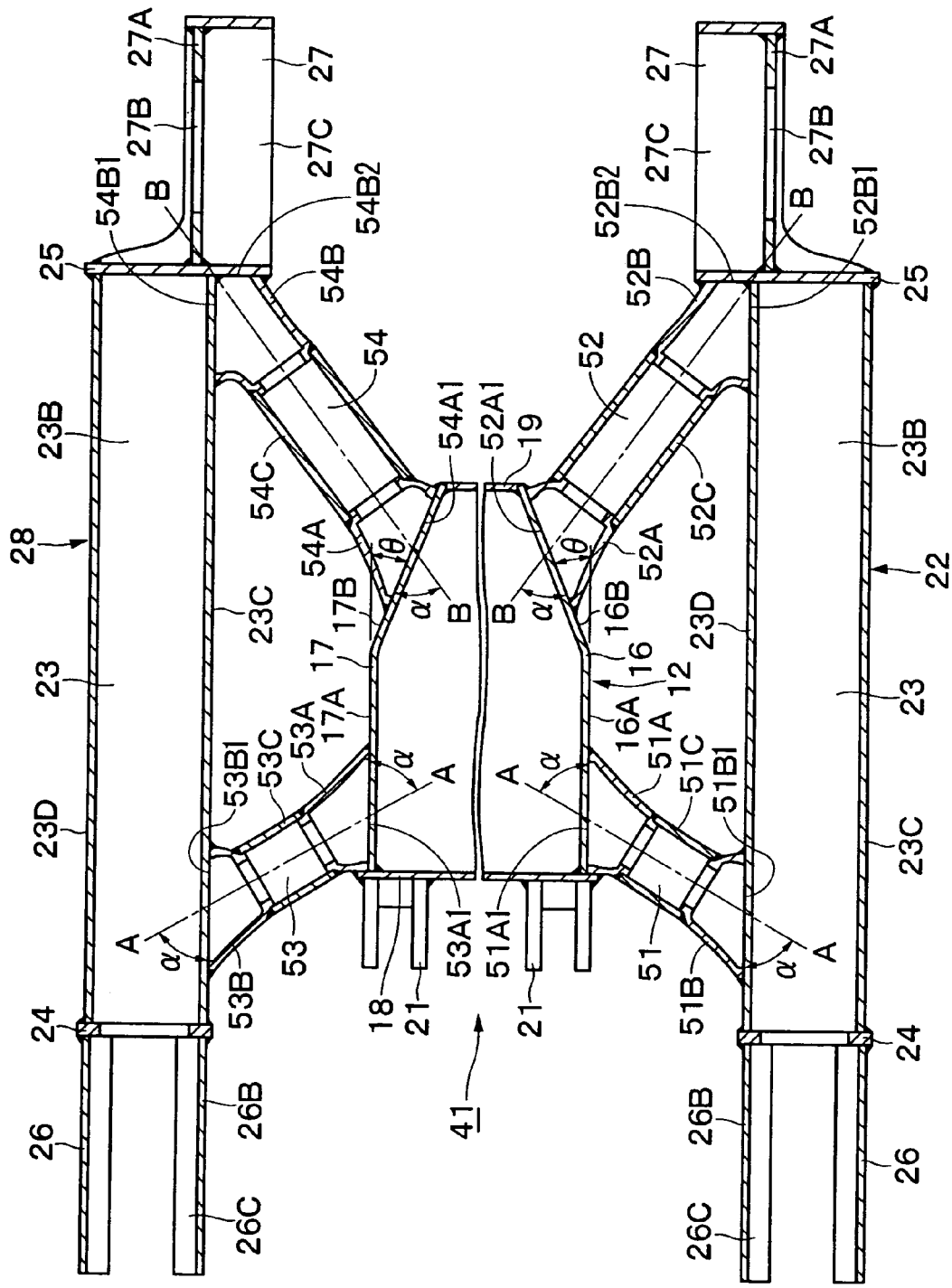
FIG. 13 is a horizontal sectional view similar to FIG. 7 but showing center frame, left and right side frames, left fore leg, left hind leg, right fore leg and right hind leg in a second embodiment of the present invention.

Shown in FIG. 12 is a second modification, i.e., another modified left fore leg 31''. In this case, the outer joint portion 31B on the side of the side frame alone is formed in the shape of a flare tube spreading toward the outer joining end 31B1 of a rectangular shape, and an inner joint portion 31A'' is formed as a tube of uniform diameter and substantially of the same diameter as the intermediate tubular portion 31C. The same applies to the left hind leg 32, right fore leg 33 and right hind leg 34.

Now, turning to FIGS. 13 to 16, there is shown a second embodiment of the present invention. This embodiment has features in that a leg is fabricated by joining three separate members, more specifically, by joining inner and outer joint members and an intermediate tubular member integrally into a single tubular structure. In the following description of the second embodiment, those component parts which are identical with counterparts in the foregoing first embodiment are simply designated by same reference numerals or characters to avoid repetitions of same explanations.

In those figures, indicated at 41 is a truck frame adopted by the second embodiment in place of the truck frame 11 of the foregoing first embodiment. Similarly to the counterpart in the first embodiment, the truck frame 11 is composed of a center frame 12, a left side frame 22, a right side frame 28, a left fore leg 51, a left hind leg 52, a right fore leg 53 and right hind leg 54, which will be described hereinafter. However, the truck frame 41 of the second embodiment employs legs 51 to 54 which are different in construction from the legs 31 to 34 of the first embodiment.

Figure 14:
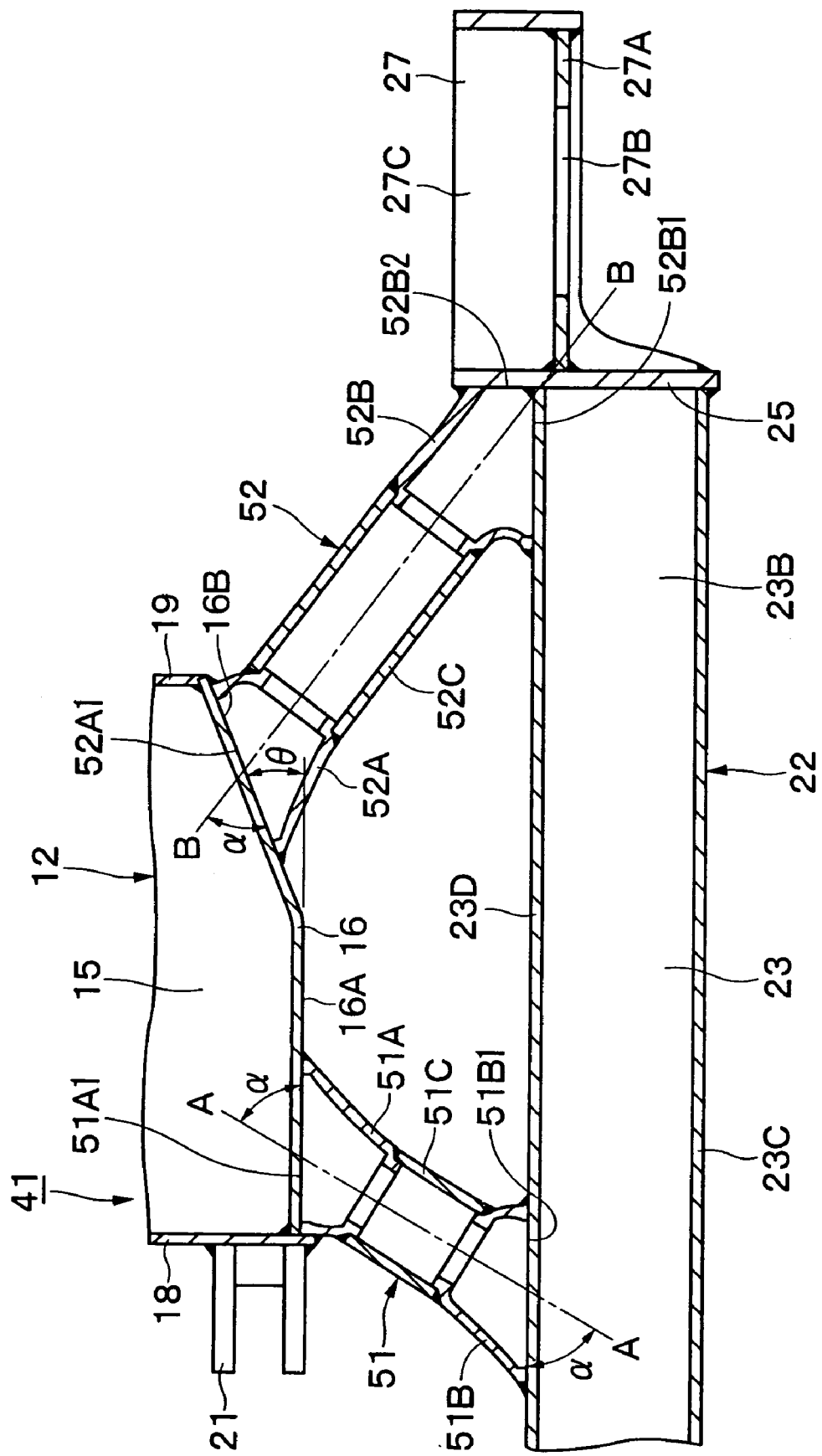
FIG. 14 is a horizontal sectional view showing on an enlarged scale the center frame, left side frame, left fore leg and left hind leg in FIG. 13.
Figure 15:
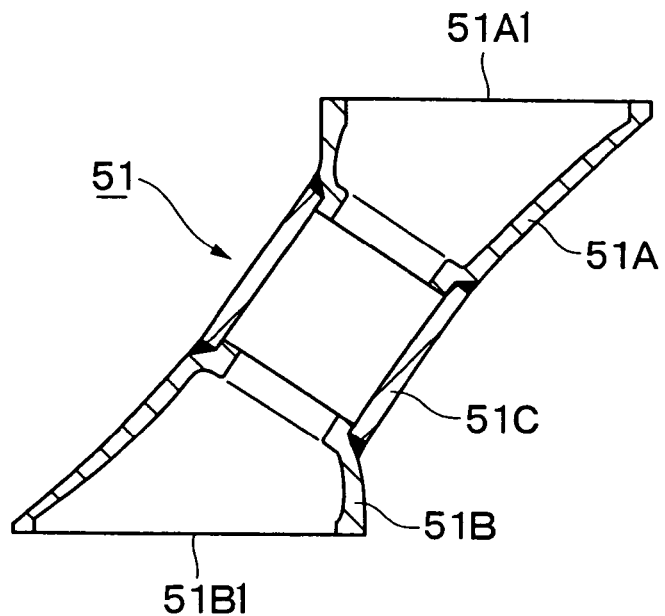
FIG. 15 is a sectional view showing the left fore leg in FIG. 14 alone.

Indicated at 51 is the left fore leg according to the second embodiment. As shown in FIGS. 14 and 15, the left fore leg 51 is composed of three originally separate members, i.e., an inner joint member 51A to be joined with the fore leg joint surface 16A of the left side plate 16 of the center frame 12, an outer joint member 51B to be joined with the right side plate 23D of the side frame 12 (the intermediate frame portion 23), and an intermediate tubular member interposed between the inner and outer joint members 51A and 51B. The left fore leg 51 is constituted by a single or unitary tubular structure which is obtained by joining together the inner and outer joint members 51A and 51B with the intermediate tubular member 51C by welding.

In this instance, the inner and outer joint members 51A and 51B are each formed by casting means using casting steel material, casting iron material or the like. On the other hand, the intermediate tubular member 51C is prepared by cutting a round steel tube.

The inner joint member 51A on the side of the center frame is formed in the shape of a flare tube which is gradually spread from the intermediate tubular member 51C toward an inner joining end 51A1 (an open end on the side of the center frame 12). The inner joining end 51A1 is formed in an open end of a rectangular shape having longer side extended in the longitudinal direction along the fore leg joint surface 16A of the left side plate 16, and arranged to butt on the fore leg joint surface 16A in a gapless state.

The outer joint member 51B on the side of the side frame is formed also in the shape of a flare tube which is gradually spread from the intermediate tubular member 51C toward an outer joining end 51B1 (an open end on the side of the side frame 22). Besides, the outer joining end 51B1 is formed in an open end of a rectangular shape having longer sides extended in the longitudinal direction along the intermediate frame portion 23 of the side frame 22, and arranged to butt on the right side plate 23D of the intermediate frame portion 23 in a gapless state.

Figure 16:
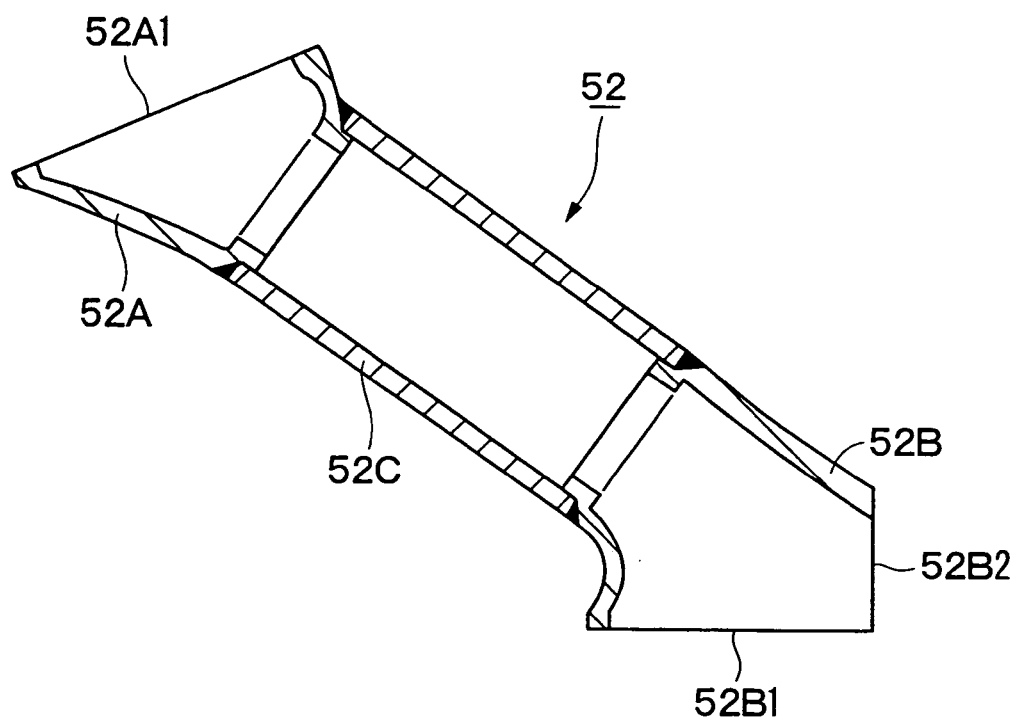
FIG. 16 is a sectional view showing the left hind leg in FIG. 14 alone.
Figure 17:
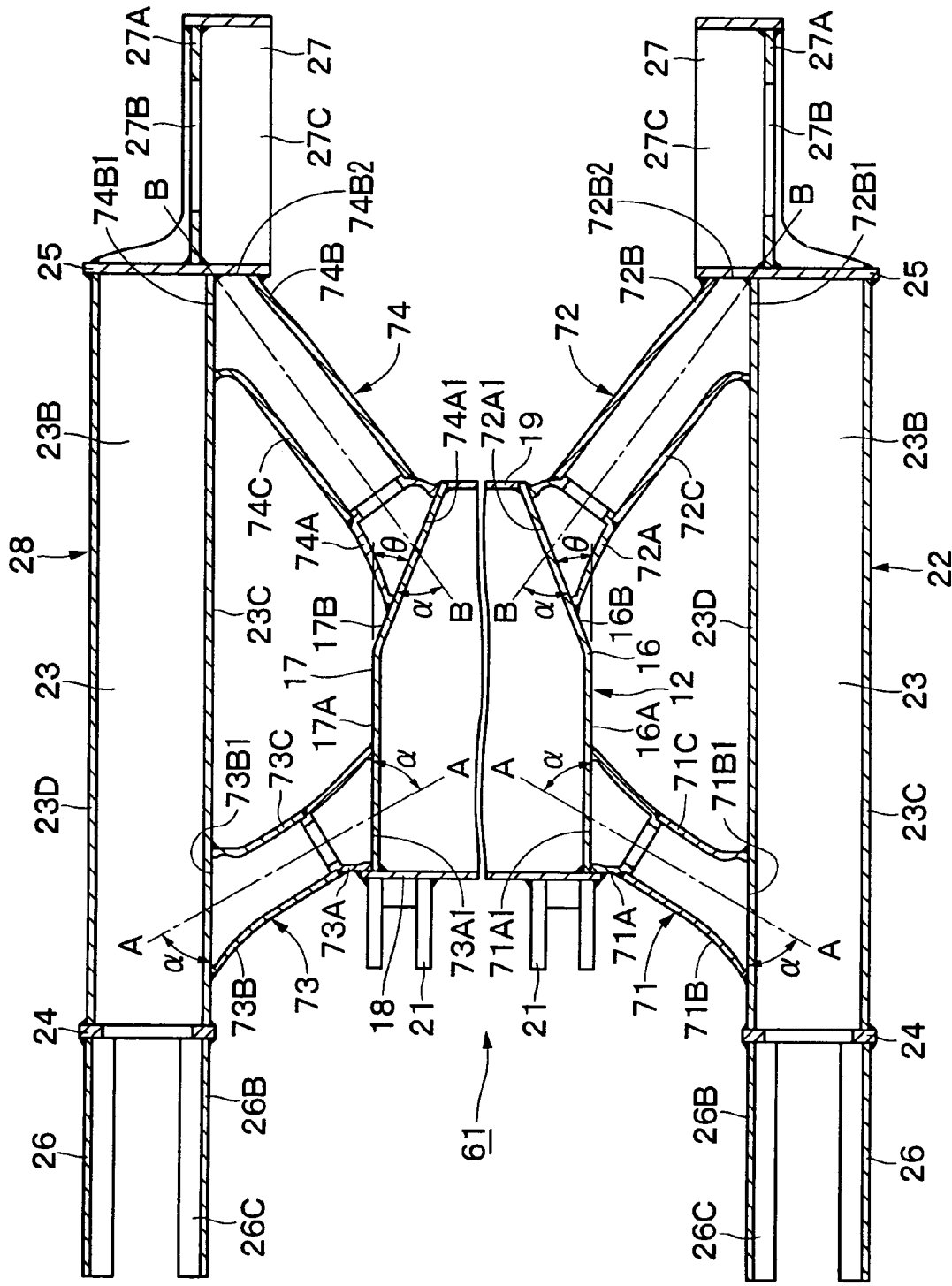
FIG. 17 is a horizontal sectional view similar to FIG. 7 but showing center frame, left and right side frames, left fore leg, left hind leg, right fore leg and right hind leg in a third embodiment of the present invention.

Indicated at 52 is the left hind leg adopted in the second embodiment. As seen in FIGS. 14 and 16, the left hind leg 52 is composed of three originally separate members, i.e., an inner joint member 52A to be joined with the hind leg joint surface 16B of the left side plate 16 of the center frame 12, an outer joint member 52B to be joined with the right side plate 23D of the side frame 22 (the intermediate frame portion 23) and the rear connecting flange 25, and an intermediate tubular member 52C interposed between the inner and outer joint members 52A and 52B. The left hind leg 52 is constituted by an unitary tubular structure which is formed by integrally joining the inner and outer joint members 52A and 52B with the intermediate tubular member 52C.

In this instance, both the inner joint member 52A on the side of the center frame and the outer joint member 52B on the side of the side frame are formed by a casting means using casting steel material, casing iron material or the like. On the other hand, the intermediate tubular member 52C is prepared by cutting a round steel pipe.

Further, the inner joint member 52A on the side of the center frame is formed in the shape of a flare tube which is gradually spread from the intermediate tubular member 52C toward an inner joining end 52A1 (an open end on the side of the center frame 12). The inner joining end 52A1 is formed in an open end of a rectangular shape having longer sides extended in the longitudinal direction along the hind leg joint surface 16B of the left side plate 16, and arranged to butt on the hind leg joint surface 16B in a gapless state.

The outer joint member 52B on the side of the side frame is also formed in the shape of a flare tube which is gradually spread from the intermediate tubular member 52C toward a first outer joining end 52B1 (an open end on the side of the side frame 22) and another or second outer joining end 52B2 (an open end on the side of the rear connecting flange 25). In this instance, the first outer joining end 52B1 is extended in the longitudinal direction along the right side plate 23D of the intermediate frame portion 23, while the second outer joining end 52B2 is extended in the transverse direction along the rear connecting flange 25. The first and second outer joining ends 52B1 and 52B2 are located at longitudinal and transverse sides of a rectangular open end which is bent at right angles in a middle portion. Further, the first and second outer joining ends 52B1 and 52B2 are arranged to butt on the right side plate 23D and the rear connecting flange 25 in a gapless state, respectively.

Indicated at 53 is a right fore leg adopted in the second embodiment. Similarly to the left fore leg 51, the right fore leg 53 is constituted by an unitary tubular structure which is formed by joining together three originally separate members, namely, an inner joint member 53A and an outer joint member 53B with an intermediate tubular member 53C. An inner joining end 53A1 of the inner joint member 53A on the side of the center frame is joined with the right side plate 17 (the fore leg joint surface 17A) of the center frame 12, while an outer joining end 53B1 of the outer joint member 53B is joined with the left side plate 23C of the side frame 28.

Denoted at 54 is a right hind leg adopted in the second embodiment. Similarly to the left hind leg 52, the right hind leg 54 is constituted by an unitary tubular structure which is formed by joining together three originally separate members, namely, an inner joint member 54A and an outer joint member 54B with an intermediate tubular member 54C. An inner joining end 54A1 of the inner joint member 54A on the side of the center frame is joined with the right side plate 17 (the hind leg joint surface 17B) of the center frame 12. A first outer joining end 54B1 of the outer joint member 54B on the side of the side frame is joined with the left side plate 23C of the side frame 28, and another or second outer joining end 54B2 is joined with the rear connecting flange 25.

Being arranged in the manner as described above, the truck frame 41 according to the second embodiment of the invention can produce substantially the same advantageous effects as the truck frame 11 of the foregoing first embodiment.

Besides, in the case of the second embodiment, both the inner joint member 51A and the outer joint member 51B of the left fore leg 51 are formed to shape by a casting means, and the intermediate tubular member 51C is prepared from a commercial steel pipe, and these three separate members are joined together by welding and formed into a single tubular structure for the left fore leg 51.

Therefore, the inner joint member 51A on the side of the center frame as well as the outer joint member 51B on the side of the side frame can be cast separately as small units. This means that both of the inner and outer joint members 51A and 51B can be fabricated economically by the use of inexpensive molds. That is to say, it becomes possible to cut the production cost of the left fore leg 51 to a significant degree. The same applies to the left hind leg 52, right fore leg 53 and right hind leg 54.

Now, turning to FIGS. 17 to 21, there is shown a third embodiment of the present invention. The third embodiment of the invention has features in that an unitary tubular structure for a leg is formed by joining together two separate members, i.e., an inner joint member on the side of the center frame and an outer joint member on the side of a side frame. An intermediate tubular portion is formed and provided integrally with the outer joint member. In the following description of the third embodiment, those component parts which are identical with counterparts in the foregoing first embodiment are simply designated by same reference numerals and characters to avoid repetitions of same explanations.

In the drawings, indicated at 61 is a truck frame adopted by the third embodiment in place of the truck frame 11 in the first embodiment. Similarly to the counterpart in the first embodiment, the truck frame 61 is composed of a center frame 12, a left side frame 22, a right side frame 28, a left fore leg 71, a left hind leg 72, a right fore leg 73 and a right hind leg 74, which will be described in greater detail hereinafter. However, the legs 71 to 74 which are employed by the truck frame 61 of the third embodiment differ in construction from the legs 31 to 34 of the first embodiment, respectively.

Figure 18:
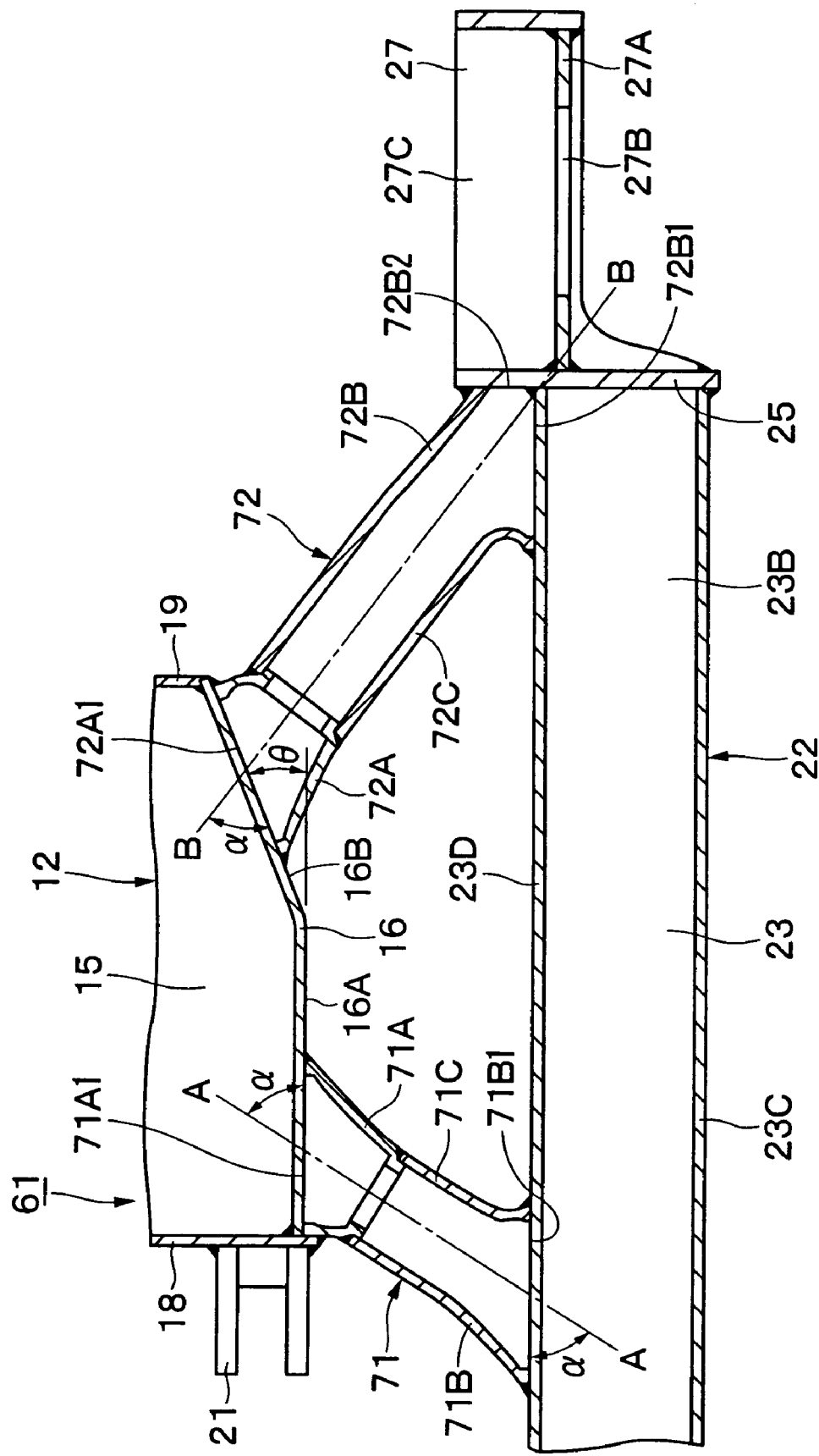
FIG. 18 is a horizontal sectional view showing on an enlarged scale the center frame, left side frame, left fore leg and left hind leg in FIG. 17.
Figure 19:
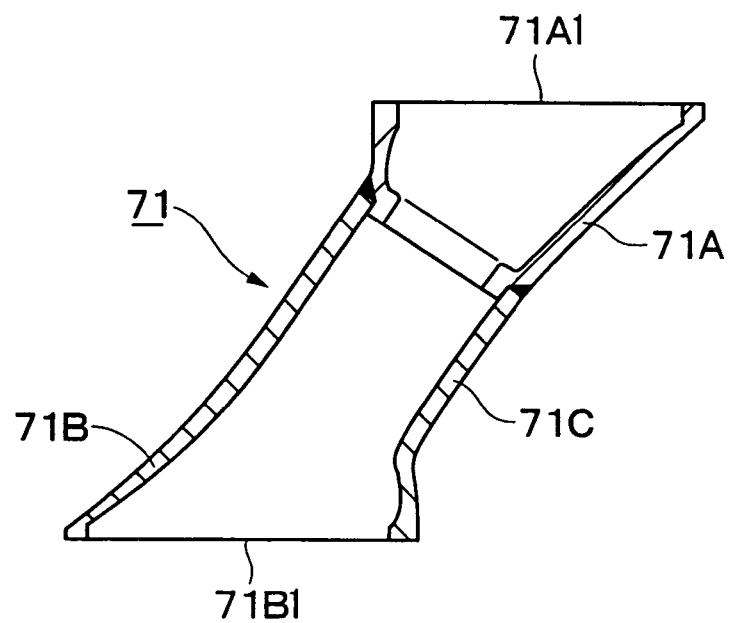
FIG. 19 is a sectional view showing the left fore leg in FIG. 18 alone.

Indicated at 71 is the left fore leg adopted in the third embodiment. As shown in FIGS. 18 and 19, the left fore leg 71 is constituted by two originally separate members, i.e., an inner joint member 71A to be joined with the fore leg joint surface 16A of the left side plate 16 of the center frame 12 and an outer joint member 71B to be joined with the right side plate 23D of the side frame 22. Namely, the left fore leg 71 is constituted by an unitary tubular structure which is formed by joining together the inner and outer joint members 71A and 71B by welding in such a way as to provide an intermediate tubular portion 71C at a longitudinally intermediate position.

In this instance, the inner joint member 71A on the side of the center frame is formed by a casting means using casting steel material, casting iron material or the like, in the shape of a flare tube which is gradually spread from the intermediate tubular portion 71C toward an inner joining end 71A1. The inner joining end 71A1 is formed as an open end of a rectangular shape having longer sides extended in the longitudinal direction along the fore leg joint surface 16A of the left side plate 16.

Similarly, the outer joint member 71B on the side of the side frame is formed by a casting means using casting steel material, casting iron material or the like, in the shape of a flare tube which is gradually spread from the intermediate tubular portion 71C toward an outer joining end 71B1. The outer joining end 71B1 is formed as an open end of a rectangular shape having its longer sides extended in the longitudinal direction along the intermediate frame portion 23 of the side frame 22. The intermediate tubular portion 71C, which is formed integrally with the outer joint member 71B, is securely joined with the inner joint member 71A on the side of the center frame.

Figure 20:
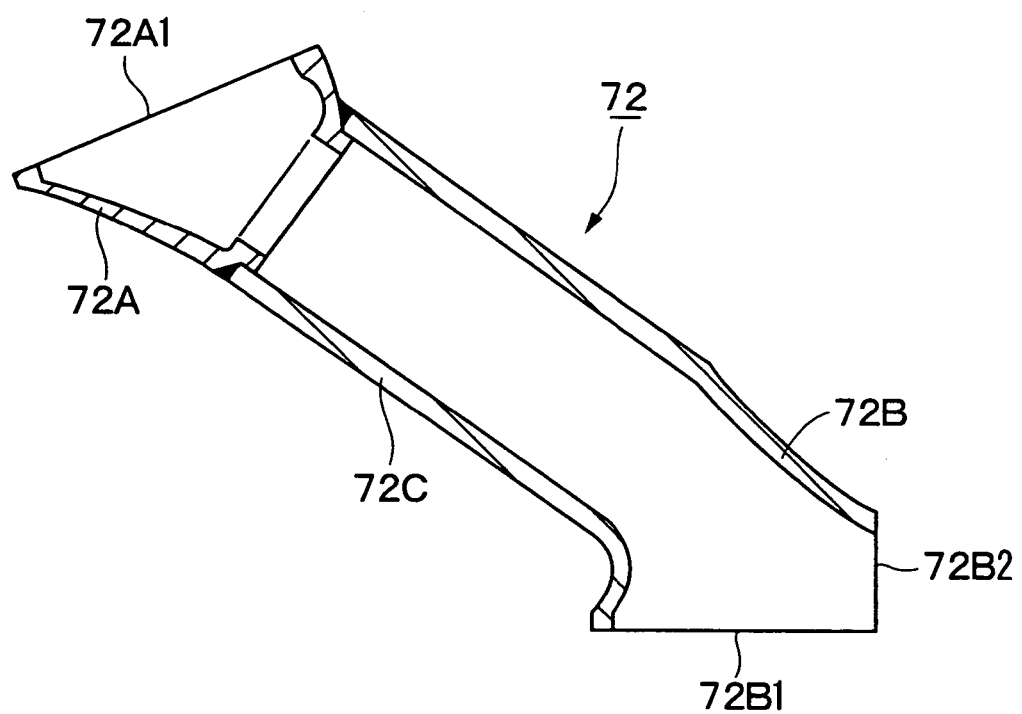
FIG. 20 is a sectional view showing the left hind leg in FIG. 18 alone.
Figure 21:
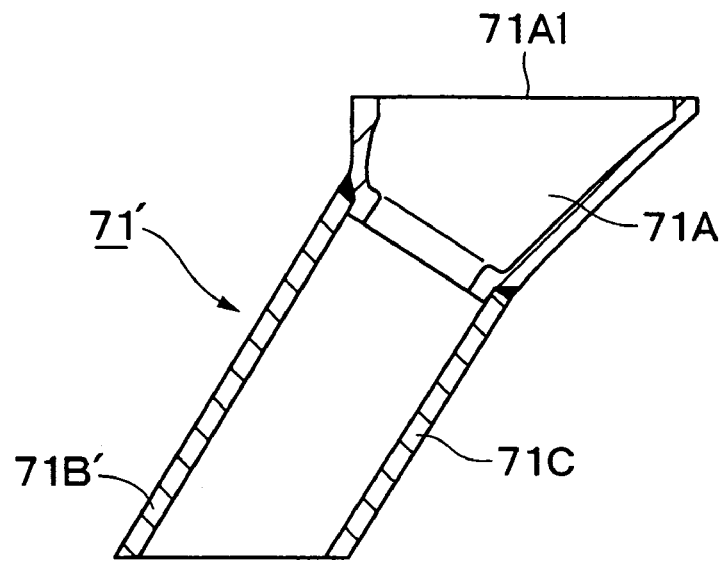
FIG. 21 is a sectional view showing a left fore leg of a third modification alone.

Indicated at 72 is the left hind leg adopted in the third embodiment. As shown in FIGS. 18 and 20, the left hind leg 72 is composed of two originally separate members, i.e., an inner joint member 72A to be joined with the hind leg joint surface 16B of the left side plate 16 of the center frame 12 and an outer joint member 72B to be joined with the right side plate 23D of the side frame 22 and the rear connecting flange 25. Namely, the left hind leg 72 is constituted by an unitary tubular structure which is formed by joining together the inner and outer joint members 72A and 72B by welding in such a way as to provide an intermediate tubular portion 72C at a longitudinally intermediate position.

In this instance, the inner joint member 72A on the side of the center frame is formed by a casting means using casting steel material, casting iron material or the like, in the shape of a flare tube which is gradually spread from the intermediate tubular portion 72C toward an inner joining end 72A1. The inner joining end 72A1 is formed as an open end of a rectangular shape having its longer sides extended in the longitudinal direction along the hind leg joint surface 16B of the left side plate 16.

Similarly, the outer joint member 72B on the side of the side frame is formed by a casting means using casting steel material, casting iron material or the like, in the shape of a flare tube having an intermediate tubular portion 72C and being gradually spread from the intermediate tubular portion 72C toward first and second outer joining ends 72B1 and 72B2. In this instance, the first outer joining end 72B1 is extended in the longitudinal direction along the right side plate 23D of the intermediate frame portion 23, while the second outer joining end 72B2 is extended in the transverse direction along the rear connecting flange 25. The first and second outer joining ends 72B1 and 72B2 are located at longitudinal and transverse sides of a rectangular open end which is bent at right angles in a middle portion.

Indicated at 73 is the right fore leg adopted in the third embodiment of the invention. Similarly to the left fore leg 71, the right fore leg 73 is constituted by an unitary tubular structure which is formed by joining together an inner joint member 73A on the side of the center frame and an outer joint member 73B on the side of the side frame in such a way as to provide an intermediate tubular portion 73C at a longitudinally intermediate position between the inner and outer joint members. An inner joining end 73A1 of the inner joint member 73A is joined with the right side plate 17 (the fore leg joint surface 17A) of the center frame 12, while the outer joining end 73B1 of the outer joint member 73B is joined with the left side plate 23C of the side frame 28.

Denoted at 74 is the right hind leg adopted in the third embodiment of the invention. Similarly to the left hind leg 72, this right hind leg 74 is constituted by an unitary tubular structure which is formed by joining together the inner and outer joint members 74A and 74B in such a way as to provide an intermediate tubular portion 74C at a longitudinally intermediate position between the inner and outer joint members. An inner joining end 74A1 of the inner joint member 74A on the side of the center frame is joined with the right side plate 17 (the hind leg joint surface 17B) of the center frame 12. First and second outer joining ends 74B1 and 74B2 of the outer joint member 74B on the side of the side frame are joined with the left side plate 23C and the rear connecting flange 25 of the side frame 28, respectively.

Being arranged in the manner as described above, the truck frame 61 according to the third embodiment of the invention can produce substantially the same advantageous effects as the truck frame 11 of the foregoing first embodiment.

Besides, according to the present embodiment, the inner and outer joint members 71A and 71B are separately formed to shape by the use of casting means. Namely, the left fore leg 71 is constituted by a single tubular structure by joining together originally separate inner and outer joint members 71A and 71B.

It follows that the inner joint member 71A on the side of the center frame and the outer joint member 71B on the side of the side frame can be cast as separate small units. Accordingly, casting molds for the inner and outer joint members 71A and 71B can be formed economically at a low cost to cut the production cost of the left fore leg 71. The same applies to the left hind leg 72, right fore leg 73 and right hind leg 74.

In the above-described third embodiment, both of the inner and outer joint members 71A and 71B of the left fore leg 71 are formed in the shape of a flare tube which is gradually spread from the intermediate tubular portion 71C (see FIG. 19).

However, in this regard, the present invention is not limited to the particular example shown. For example, the left fore leg may be arranged like a left fore leg 71' which is shown as a third modification in FIG. 21. In the case of the left fore leg 71' of third modification, the inner joint member 71A on the side of the center frame alone is formed in the shape of a flare tube which is gradually spread toward the inner joining end 71A1 of a rectangular shape, and the outer joint member 71B' on the side of the side frame is formed in the shape of a tube of uniform diameter which is substantially same as the diameter of the intermediate tubular portion 71C. The arrangements can be applied similarly to left hind leg 72, right fore leg 73 and right hind leg 74.

Figure 22:
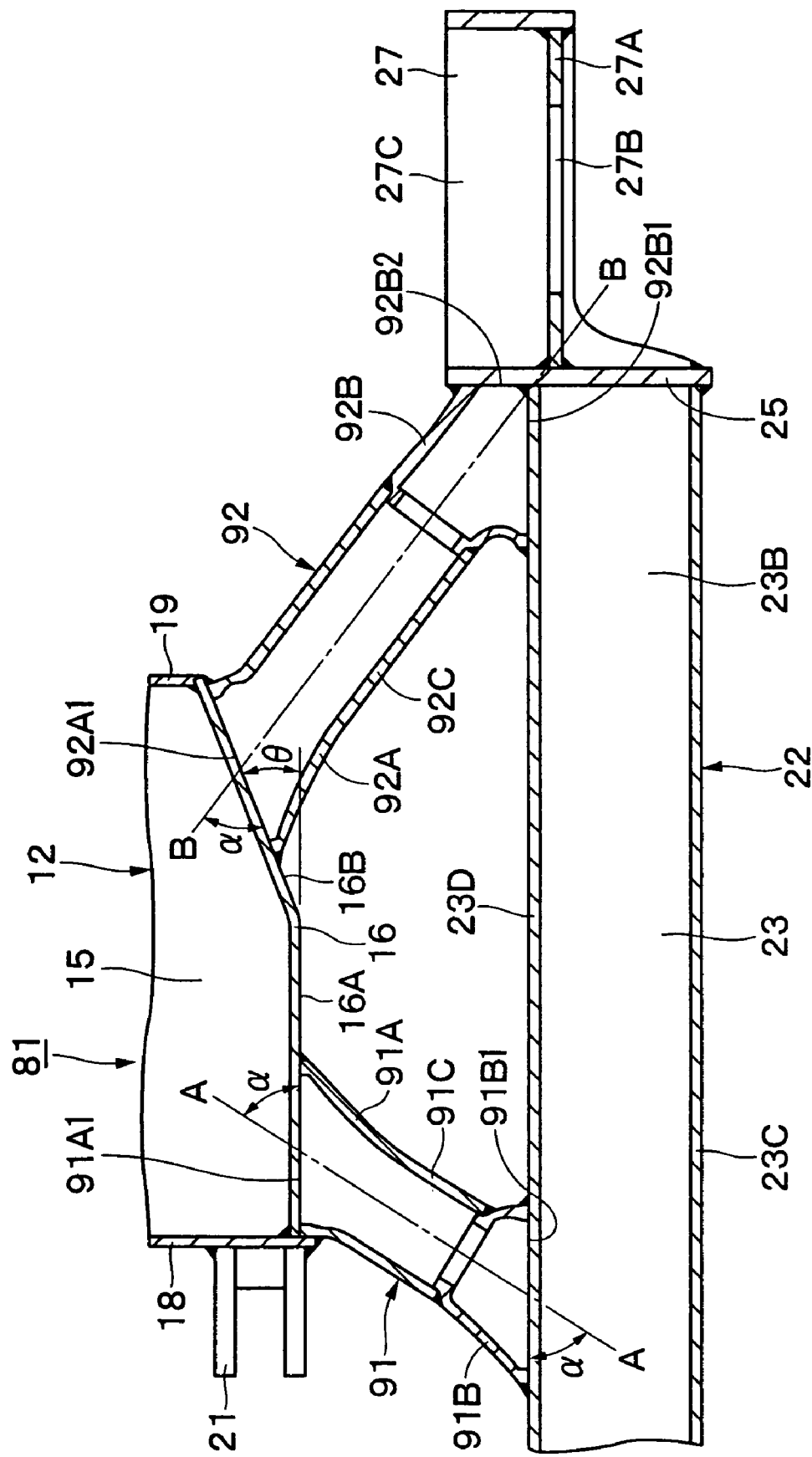
FIG. 22 is an enlarged horizontal sectional view of center frame, left side frame, left fore leg and left hind leg adopted in a fourth embodiment of the present invention.
Figure 25:
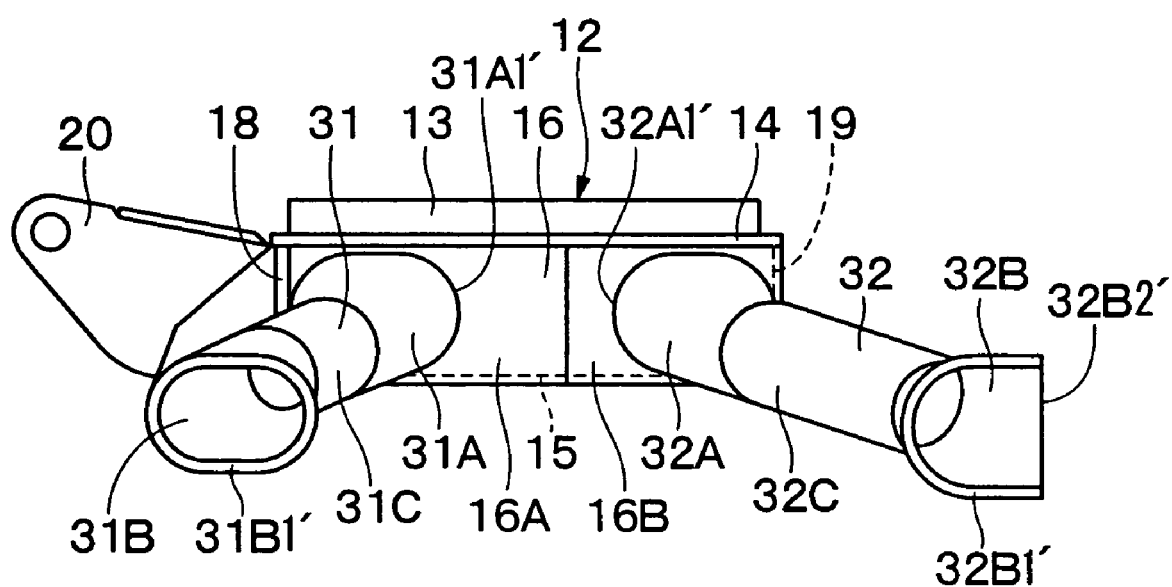
FIG. 25 is a front view similar to FIG. 6 but showing modifications of joining ends of the left fore leg and the left hind leg.

Now, turning to FIG. 22, there is shown a fourth embodiment of the present invention. This embodiment of the invention has features in that a leg in the form of an unitary tubular structure is formed by joining together two originally separate members, i.e., an inner joint member on the side of the center frame and an outer joint member on the side of the side frame, and the intermediate tubular portion is provided integrally with the inner joint member. In the following description of the fourth embodiment, those component parts which are identical with counterparts in the foregoing first embodiment are simply designated by same reference numerals and characters to avoid repetitions of same explanations.

In the drawings, indicated at 81 is a truck frame adopted in the fourth embodiment of the invention. This truck frame 81 is composed of a center frame 12, a left side frame 22, a right side frame (not shown), a left fore leg 91 which will be described in greater detail hereinafter, a left hind leg 92, a right fore leg and a right hind leg (which are not shown in the drawings).

Indicated at 91 is the left fore leg adopted in the fourth embodiment of the invention. This left fore leg 91 is composed of two originally separate members, i.e., an inner joint member 91A to be joined with the fore leg joint surface 16A of the left side plate 16 of the center frame 12, and an outer joint member 91B to be joined with the right side plate 23D of the side frame 22. Namely, the left fore leg 91 is constituted by an unitary tubular structure which is formed by joining together the inner and outer joint members 91A and 91B by welding in such a way as to provide an intermediate tubular portion 91C at an intermediate position between the inner and outer joint members.

In this instance, the inner joint member 91A on the side of the center frame is formed in the shape of a flare tube which is integrally provided with an intermediate tubular portion 91C at one end and gradually spread from the intermediate tubular portion 91C toward an inner joining end 91A1. The inner joining end 91A1 is formed as an open end of a rectangular shape having its longer sides extended in the longitudinal direction along the fore leg joint surface 16A of the left side plate 16.

On the other hand, the outer joint member 91B on the side of the side frame is formed in the shape of a flare tube which is gradually spread from the intermediate tubular portion 91C toward an outer joining end 91B1. The outer joining end 91B1 is formed as an open end of a rectangular shape having its longer sides extended in the longitudinal direction along the intermediate frame portion 23 of the side frame 22.

Designated at 92 is a left hind leg adopted in the fourth embodiment of the present invention. The left hind leg 92 is composed of two originally separate members, i.e., an inner joint member 92A to be joined with the hind leg joint surface 16B of the left side plate 16 of the center frame 12, and an outer joint member 92B to be joined with the right side plate 23D of the side frame 22. Namely, the left hind leg 92 is constituted by an unitary tubular structure which is formed by joining together the inner and outer joint members 92A and 92B by welding in such a way as to provide an intermediate tubular portion 92C at a longitudinally intermediate position between the inner and outer joint members.

In this instance, the inner joint member 92A on the side of the center frame is formed by the use of a casting means, in the shape of a flare tube which is provided with an intermediate tubular portion 92C integrally at one end thereof and gradually spread from the intermediate tubular portion 92C toward an inner joining end 92A1. The inner joining end 92A1 is an open end of a rectangular shape having its longer sides extended in the longitudinal direction along the hind leg joint surface 16B of the left side plate 16.

On the other hand, the outer joint member 92B on the side of the side frame is formed by the use of a casting means, in the shape of a flare tube which is gradually spread from the intermediate tubular portion 92C toward a first and second outer joining ends 92B1 and 92B2. In this instance, the first outer joining end 92B1 is extended in the longitudinal direction along the right side plate 23D of the intermediate frame portion 23, and the second outer joining end 92B2 is extended in the transverse direction along the rear connecting flange 25. The first and second outer joining ends 92B1 and 92B2 of the outer joint member are located at the longitudinal and transverse sides of a rectangular open end which is bent at right angles in a middle portion thereof.

In this case, the right fore leg and the right hind leg which connect the right side frame to the center frame 12 are arranged in the same way as the above-described left fore leg 91 and the left hind leg 92, respectively.

Being arranged in the manner as described above, the truck frame 81 according to the fourth embodiment of the invention can produce substantially the same advantageous effects as the truck frame 61 of the foregoing third embodiment.

In the above-described fourth embodiment, by way of example both of the inner and outer joint members 91A and 91B of the left fore leg 91 are formed in the shape of a flare tube which is gradually spread from the intermediate tubular portion 91C.

Figure 23:
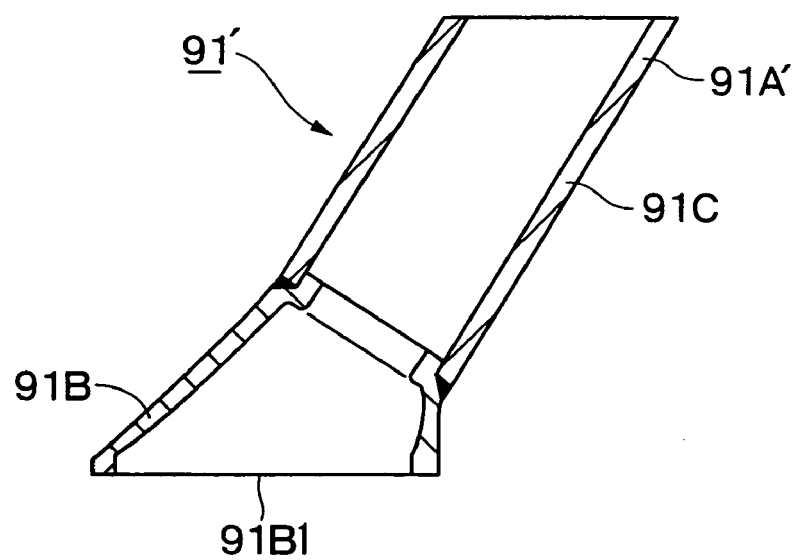
FIG. 23 is a sectional view showing a left fore leg of a fourth modification alone.

However, in this regard, it is to be understood that the present invention is not limited to the particular example shown. For example, it is possible to arrange the leg like a left fore leg 91' which is shown in FIG. 23 as a fourth modification. More specifically, in this case, the outer joint member 91B on the side of the side frame alone is formed in the shape of a flare tube, while an inner joint member 91A' on the side of the center frame is formed in the shape of a tube of uniform diameter, which is substantially same as the diameter of the intermediate tubular portion 91C. The same arrangements can be similarly applied to the left hind leg 92, right fore leg and right hind leg.

Now, turning to FIG. 24, there is shown a fifth embodiment of the present invention. This embodiment has features in that an unitary tubular structure for a leg is formed by joining together two separate members, that is, by joining together an inner joint member on the side of the center frame and an outer joint member on the side of a side frame.

One part of an intermediate tubular portion is provided integrally with the inner joint member, while the other part of the intermediate tubular portion is provided integrally with the outer joint member. In the following description of the fifth embodiment, those component parts which are identical with counterparts in the foregoing first embodiment are simply designated by same reference numerals and characters to avoid repetitions of same explanations.

In the drawings, indicated at 101 is a truck frame according to the fifth embodiment of the invention. This truck frame 101 is composed of a center frame 12, a left side frame 22, a right side frame (not shown), a left fore leg 111 and a left hind leg 112 which will be described hereinafter, and a right fore leg and a right hind leg (both not shown).

Indicated at 111 is a left fore leg adopted in the fifth embodiment of the invention. This left fore leg 111 is composed of an inner joint member 111A to be joined with the fore leg joint surface 16A of the left side plate 16 of the center frame 12, and an outer joint member 111B to be joined with the right side plate 23D of the side frame 22. Namely, the left fore leg 111 is constituted by an unitary tubular structure which is formed by joining together inner and outer joint member 111A and 111B by welding in such a way as to provide an intermediate tubular portion 111C at a longitudinally intermediate position.

In this instance, the inner joint member 111A on the side of the center frame 12 is formed by a casting means, in the shape of a flare tube which is integrally provided with one part of partial intermediate tubular portion 111A1 for an intermediate tubular portion 111C at one end thereof and gradually spread from the intermediate tubular portion 111C toward an inner joining end 111A2. The inner joining end 111A2 is an open end of a rectangular shape having its longer sides extended in the longitudinal direction along the fore leg joint surface 16A of the left side plate 16.

Similarly, the outer joint member 111B on the side of the side frame is formed by a casting means, in the shape of a flare tube which is integrally provided with the other part of partial intermediate tubular portion 111B1 for an intermediate tubular portion 111C at one end thereof and gradually spread from the intermediate tubular portion 111C toward an outer joining end 111B2. The outer joining end 111B2 is an open end of a rectangular shape having its longer sides extended in the longitudinal direction along the intermediate frame portion 23 of the side frame 22.

Thus, the left fore leg 111, with an intermediate tubular portion 111C at a longitudinally intermediate position between the inner and outer joint members, is formed upon joining the partial intermediate tubular portion 111A1 on the side of the inner joint member 111A with the partial intermediate tubular portion 111B1 on the side of the outer joint member 111B.

Indicated at 112 is a left hind leg adopted in the fifth embodiment of the invention. This left hind leg 112 is composed of two originally separate members, i.e., an inner joint member 112A to be joined with the left side plate 16 of the center frame 12, and an outer joint member 112B to be joined with the right side plate 23D of the side frame 22. Namely, the left hind leg 112 is constituted by an unitary tubular structure which is formed by joining together the inner and outer joint members 112A and 112B by welding in such a way as to provide an intermediate tubular portion 112C at a longitudinally intermediate position.

In this instance, the inner joint member 112A on the side of the center frame is formed by the use of a casting means, in the shape of a flare tube which is provided with one part of partial intermediate tubular portion 112A1 for an intermediate tubular portion 112C integrally at one end thereof and gradually spread from the intermediate tubular portion 112C toward an inner joining end 112A2. The inner joining end 112A2 is an open end of a rectangular shape having its longer sides extended in the longitudinal direction along the hind leg joint surface 16B of the left side plate 16.

Similarly, the outer joint member 112B on the side of the side frame is formed by the use of a casting means, in the shape of a flare tube which is provided with the other part of partial intermediate tubular portion 112B1 for an intermediate tubular portion 112C integrally at one end thereof and gradually spread from the intermediate tubular portion 112C toward first and second outer joining ends 112B2 and 112B3. The first outer joining end 112B2 is extended in the longitudinal direction along the right side plate 23D of the intermediate frame portion 23, while the second outer joining end 112B3 is extended in the transverse direction along the rear connecting flange 25. The first and second outer joining ends 112B2 and 112B3 are located at longitudinal and transverse sides of a rectangular open end which is bent at right angles in a middle portion.

The left hind leg 112, with an intermediate tubular portion 112C at a longitudinally intermediate position, is formed upon joining the partial intermediate tubular portion 112A1 on the side of the inner joint member 112A with the partial intermediate tubular portion 112B1 on the side of the outer joint member 112B.

The right fore leg and the right hind leg which connect the right side frame to the center frame 12 are arranged in the same way as the above-described left fore leg 111 and the left hind leg 112, respectively.

Being arranged in the manner as described above, the truck frame 101 according to the fifth embodiment of the invention can produce substantially the same advantageous effects as the truck frame 61 of the foregoing third embodiment.

In the above-described first embodiment, there is shown an example in which the inner joining end 31A1 of the inner joint portion 31A of the left fore leg 31 as well as the outer joining end 31B1 of the outer joint portion 31B is formed in a rectangular shape, and also the inner joining end 32A1 of the inner joint portion 32A of the left hind leg 32 and the first and second outer joining ends 32B1 and 32B2 of the outer joint portion 32B are formed in a rectangular shape (see FIG. 6).

However, it is to be understood that the present invention is not limited to the particular example shown. For example, as shown in a modification of FIG. 25, it is possible to form respective joining ends 31A1' and 31B1' of the left fore leg 31 and respective joining ends 32A1', 32B1' and 32B2' of left hind leg 32 in an elliptical or oblong shape. The same applies to the right fore leg 33 and the right hind leg 34. Similarly, the oblong joining end arrangement can be applied to the legs 51 to 54 in the second embodiment, the legs 71 to 74 in the third embodiment, the legs 91 and 92 in the fourth embodiment, and the legs 111 and 112 in the fifth embodiment.

Further, in the foregoing embodiments, by way of example the present invention is applied to a cab type hydraulic excavator which has a cab 9 on the upper structure 6. Needless to say, the present invention is not limited to a hydraulic excavator of that type. For example, the present invention can be similarly applied to a canopy type hydraulic excavator with a canopy over an operator's seat.

Further, the truck frame according to the present invention is applicable to not only a lower structure of a hydraulic excavator but also lower structures of hydraulic cranes or other construction machines.

The invention claimed is:

1. A truck frame for a construction machine, including a center frame for mounting an upper structure, right and left side frames located on the right and left sides of said center frame and extended toward front and rear ends, fore and hind legs provided on each side of said center frame to connect said right and left side frames, characterized in that:

said center frame includes a top plate having a round girth member to support thereon said upper structure rotatably through a swing ring, a bottom plate located under said top plate in face to face relation, and right and left side plates attached to right and left sides of said top and bottom plates across said round girth member; each one of said right and left side plates is composed of a fore leg joint surface and a hind leg joint surface in front and rear portions thereof for joining thereto inner joint portions of said fore and hind legs, respectively, said fore leg joint surface being extended in a longitudinal direction and in parallel relation with said side frame, and said hind leg joint surface being disposed angularly relative to said fore leg joint surface and extended in an oblique direction to turn away from said side frame in a rearward direction;

each one of said fore legs is composed of said inner joint portion joined with said fore leg joint surface of said center frame by welding, an outer joint portion joined with one of said side frames by welding, and an intermediate tubular portion provided between said inner joint portion on the side of said center frame and said outer joint portion on the side of said side frame;

each one of said hind legs is composed of said inner joint portion joined with said hind leg joint surface of said center frame by welding, an outer joint portion joined with one of said side frames by welding, and an intermediate tubular portion provided between said inner joint portion on the side of said center frame and said outer joint portion on the side of said side frame;

each of said inner and outer joint portions being formed in the shape of a flare tube being spread gradually from said intermediate tubular portion toward a joining end, respectively; and said joining ends of each of said joint portions being an open end of a substantially rectangular shape, respectively.

2. A truck frame for a construction machine as defined in claim 1, wherein said legs are each constituted by an unitary tubular structure formed by a casting means, whereby said inner and outer joint portions and said intermediate tubular portion are formed as an integral structure.

3. A truck frame for a construction machine as defined in claim 1, wherein said legs are each constituted by an unitary tubular structure formed by joining together three members including an inner joint member for said inner joint portion on the side of said center frame, an outer joint member for said outer joint portion on the side of said side frame and an intermediate tubular member for said intermediate tubular portion.

4. A truck frame for a construction machine as defined in claim 1, wherein said legs are each constituted by an unitary tubular structure formed by joining together said inner joint member for said inner joint portion on the side of said center frame and said outer joint member for said outer joint portion on the side of either one of said side frames so as to provide said intermediate tubular portion in a longitudinally intermediate position between inner and outer joint portions.

5. A truck frame for a construction machine as defined in claim 1, wherein said fore legs are each extended in an obliquely forward direction toward said side frame from said fore leg joint surface on a side plate of said center frame, and said hind legs are each extended in an obliquely rearward direction toward said side frame from said hind leg joint surface on a side plate of said center frame, such that axial center lines of said fore and hind legs intersect said fore leg joint surface and said hind leg joint surface with the same angle of intersection, respectively.

* * * * *